(12) United States Patent
Saha et al.

(10) Patent No.: US 11,392,358 B1
(45) Date of Patent: Jul. 19, 2022

(54) MACHINE LEARNING PIPELINE SKELETON INSTANTIATION

(71) Applicant: FUJITSU LIMITED, Kawasaki (JP)

(72) Inventors: Ripon Saha, Pleasanton, CA (US); Mukul Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/183,655

(22) Filed: Feb. 24, 2021

(51) Int. Cl.
| | |
|---|---|
| *G06F 8/36* | (2018.01) |
| *G06F 8/41* | (2018.01) |
| *G06K 9/62* | (2022.01) |
| *G06N 20/00* | (2019.01) |

(52) U.S. Cl.
CPC .............. *G06F 8/4452* (2013.01); *G06F 8/36* (2013.01); *G06F 8/433* (2013.01); *G06K 9/6256* (2013.01); *G06N 20/00* (2019.01)

(58) Field of Classification Search
CPC ........................................................ G06F 8/36
See application file for complete search history.

(56) References Cited

U.S. PATENT DOCUMENTS

| | | | | |
|---|---|---|---|---|
| 9,354,848 | B2 * | 5/2016 | Fischer ..................... | G06F 8/36 |
| 2020/0380301 | A1 * | 12/2020 | Siracusa ................ | G06N 20/00 |
| 2021/0326736 | A1 * | 10/2021 | Kishimoto ........... | G06K 9/6227 |

OTHER PUBLICATIONS

LIME (Local Interpretable Model-agnostic Explanation) Ribeiro et al., "Why Should I Trust You?": Explaining the Predictions of Any Classifier, SIGKDD 2016.

SHAP (SHapley Additive exPlanations) Lundberg and Lee, "A Unified Approach to Interpreting Model Predictions," NIPS 2017.
AutoSklearn: Matthias Feurer, Aaron Klein, Katharina Eggensperger, Jost Springenberg, Manuel Blum, and Frank Hutter. 2015. Efficient and robust automated machine learning. In Advances in Neural Information Processing Systems. 2962-2970.
TPOT: Randal S Olson, Nathan Bartley, Ryan J Urbanowicz, and Jason H Moore. 2016. Evaluation of a tree-based pipeline optimization tool for automating data science. In Proceedings of the 2016 on Genetic and Evolutionary Computation Conference. ACM, 485-492.
AMS: José Cambronero, Jürgen Cito, Martin Rinard (2020). AMS: Generating AutoML search spaces from weak specifications. In Proceedings of ESEC/FSE 2020.

(Continued)

*Primary Examiner* — Jae U Jeon
(74) *Attorney, Agent, or Firm* — Maschoff Brennan

(57) ABSTRACT

Operations include obtaining a machine learning (ML) pipeline skeleton that indicates a set of first functional blocks to use to process a new dataset of a new ML project. The operations also include obtaining a relationship mapping that maps dataset features to respective functional blocks, the relationship mapping indicating correspondences between dataset features of existing datasets of existing ML projects and usage of second functional blocks of existing ML pipelines of the existing ML projects. The operations also include mapping the first functional blocks to respective portions of the new dataset based on the relationship mapping. In addition, the operations include instantiating the pipeline skeleton with respective code snippets that each correspond to a respective first functional block of the set of first functional blocks, the respective code snippets each including one or more respective code elements that are based on the mapping of the first functional blocks.

20 Claims, 12 Drawing Sheets

(56) References Cited

OTHER PUBLICATIONS

AL: Cambronero, Jose P., and Martin C. Rinard. "AL: autogenerating supervised learning programs." Proceedings of the ACM on Programming Languages 3, No. OOPSLA (2019):1-28.
AutoPandas: Bavishi, Rohan, Caroline Lemieux, Roy Fox, Koushik Sen, and Ion Stoica. "AutoPandas: neural-backed generators for program synthesis." Proceedings of the ACM on Programming Languages 3, No. OOPSLA (2019): 1-27.
U.S. Appl. No. 17/013,136, filed Sep. 4, 2020.
U.S. Appl. No. 17/010,660, filed Sep. 2, 2020.

* cited by examiner

MACHINE LEARNING PIPELINE SKELETON INSTANTIATION

FIELD

The embodiments discussed in the present disclosure are related to instantiation of machine learning pipeline skeletons.

BACKGROUND

Machine learning (ML) generally employs ML models that are trained with training data to make predictions that automatically become more accurate with ongoing training. ML may be used in a wide variety of applications including, but not limited to, traffic prediction, web searching, online fraud detection, medical diagnosis, speech recognition, email filtering, image recognition, virtual personal assistants, and automatic translation.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include obtaining a machine learning (ML) pipeline skeleton that indicates a set of first functional blocks to use to process a new dataset of a new ML project. The operations may further include obtaining a relationship mapping that maps dataset features to respective functional blocks, the relationship mapping indicating correspondences between dataset features of existing datasets of existing ML projects and usage of second functional blocks of existing ML pipelines of the existing ML projects. The operations may also include mapping the first functional blocks to respective portions of the new dataset based on the relationship mapping. In addition, the operations may include instantiating the pipeline skeleton with respective code snippets that each correspond to a respective first functional block of the set of first functional blocks, the respective code snippets each including one or more respective code elements that are based on the mapping of the first functional blocks.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
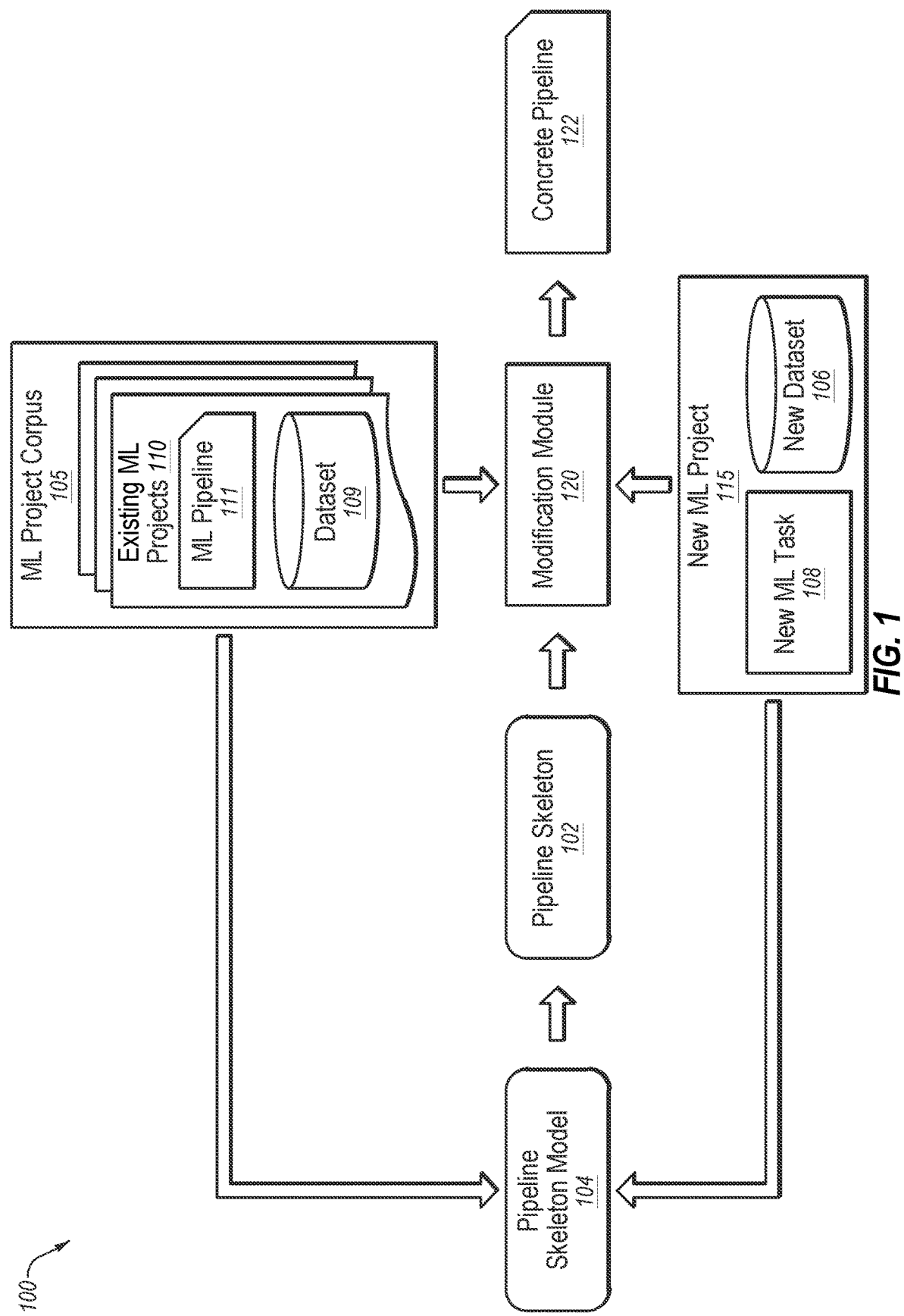
FIG. 1 is a diagram representing an example environment related to automatically generating new machine learning projects based on existing machine learning projects.

Some embodiments described in the present disclosure relate to methods and systems of automatically adapting existing Machine Learning (ML) projects into new ML projects.

As ML has become increasingly common, there is often a scarcity of ML experts (e.g., skilled data scientists) available to implement new ML projects. Although various AutoML solutions (e.g. Auto-Sklearn, AutoPandas, etc.) have been proposed to resolve the ever-growing challenge of implementing new ML projects with a scarcity of ML experts, current AutoML solutions offer only simplistic and partial solutions that are insufficient to enable non-experts to fully implement new ML projects. Further, although open source software (OSS) databases of existing ML projects (e.g., Kaggle, GitHub, etc.) have also been proposed as another solution for the challenge of implementing new ML projects by non-experts, it may be difficult or impossible for a non-expert to find a potentially useful existing ML project in these databases. Further, even if the non-expert should succeed in finding a potentially useful existing ML project in these databases, it can be difficult or impossible for the non-expert to modify the potentially useful existing ML project for the new requirements of a new ML project.

In the present disclosure, the term "ML project" may refer to a project that includes a dataset, an ML task defined on the dataset, and an ML pipeline (e.g., a script or program code) that is configured to implement a sequence of operations to train a ML model, on the dataset, for the ML task and use the ML model for new predictions. In the present disclosure, the term "computational notebook" may refer to a computational structure used to develop and/or represent ML pipelines, especially during the development phase (e.g., a Jupyter notebook). Although embodiments disclosed herein are illustrated with ML pipelines in the Python programming language and computational notebooks structured as Jupyter notebooks, it is understood that other embodiments may include ML pipelines written in different languages and computational notebooks structured in other platforms.

According to one or more embodiments of the present disclosure, operations may be performed to automatically adapt existing ML projects into new ML projects. For example, in some embodiments a computer system may organically support the natural workflow of data-scientists by building on a "search-and-adapt" style work-flow where a data-scientist would first search for existing ML projects that can serve as good starting point for building a new ML project and then suitably adapt the existing ML projects to build an ML pipeline for a new dataset and a new ML task of a new ML project.

For example, in some embodiments a computer system may automatically mine raw ML projects from OSS databases of existing ML projects and may automatically curate the raw ML projects prior to storing them in a corpus of existing ML projects. In some embodiments, this mining and curation of existing ML projects from large-scale repositories may result in a corpus of diverse, high-quality existing ML projects that can be used in a search-and-adapt workflow. Also, this curation may involve cleaning the ML pipelines of the existing ML projects (e.g., using dynamic program slicing) and may involve computing a set of features to capture quality and diversity of each ML project and to select an optimal number of existing ML projects consistent with these goals.

Also, in some embodiments, this curation may entail operations performed to automatically identify and index functional blocks in the ML pipelines of the existing ML projects. Unlike traditional software programs, ML pipelines of ML projects generally follow a well-defined workflow based on the dataset properties, and can be viewed as a sequence of functional blocks. Therefore, some embodiments may involve a technique to automatically extract and label functional blocks in ML pipelines to index them properly in the corpus so that they can be efficiently searched to synthesize a new ML pipeline for a new ML task. More particularly, this technique may abstract the ML pipelines at an appropriate level and may employ a graph-based sequence mining algorithm to extract both custom and idiomatic functional blocks. Finally, each functional block may be labelled semantically.

In the present disclosure reference to "functional blocks" may refer to operations that may be performed by the ML pipelines in which a particular functional block may correspond to a particular type of functionality. The semantic labeling may indicate the functionality of the corresponding functional block. Further, each functional block may be instantiated in its corresponding ML pipeline with a particular code snippet configured to cause execution of the functionality of the corresponding functional block. In many instances, a same functional block across different ML pipelines may have different instantiations in each of the different ML pipelines.

In some embodiments, upon receipt of a new dataset and a new ML task for a new ML project, such as from a non-expert data scientist, the computer system may automatically use a hierarchical approach to first synthesize a functional block-level pipeline skeleton for the new ML project using an ML model. Additionally or alternatively, the computer system may obtain the pipeline skeleton via another mechanism (e.g., from a user input). The pipeline skeleton may indicate which functional blocks may be used for the new ML project.

In some instances, the obtained pipeline skeleton may include functional blocks that may technically be different from each other but that may also be similar enough that they may be considered redundant. Additionally or alternatively, as indicated above, the pipeline skeleton may indicate which functional blocks may be used for the new ML project, but in some instances may not indicate an order of use of the functional blocks. As discussed in detail below, in some embodiments, the computer system may be configured to refine the obtained pipeline skeleton by removing functional blocks according to a redundancy analysis. Additionally or alternatively, the computer system may be configured to identify an order of the functional blocks of the pipeline skeleton and may refine the pipeline skeleton accordingly.

The pipeline skeleton may indicate which functional blocks to use for the new ML project but may not indicate an instantiation of the functional blocks. As discussed in detail below, in some embodiments the computer system may also be configured to determine to which portions of the new dataset to apply each of the functional blocks of the pipeline skeleton. Additionally or alternatively, the computer system may be configured to identify existing code snippets of existing ML projects that may be used to instantiate pipeline skeleton into a concrete pipeline skeleton for the new ML project.

Therefore, in some embodiments, a non-expert data scientist may merely formulate a new dataset and a new ML task for a new ML project, and the computer system may then implement a tool-assisted, interactive search-and-adapt work flow to automatically generate a new ML pipeline for the ML project that can be immediately executed to perform the new ML task on the new dataset, without any modification by the non-expert data scientist. Thus, some embodiments may empower novice data scientists to efficiently create new high-quality end-to-end ML pipelines for new ML projects.

According to one or more embodiments of the present disclosure, the technological field of ML project development may be improved by configuring a computing system to automatically generate new ML projects based on existing ML projects, as compared to tasking a data scientist (e.g., who is often a non-expert) to manually find a potentially useful existing ML project and modify the potentially useful existing ML project for the new requirements of a new ML project. Such a configuration may allow the computing system to better search for relevant existing ML projects and use them to generate new ML projects by identifying and extracting functional blocks and corresponding instantiations thereof from existing ML pipelines and automatically using and modifying them for use in new ML pipelines.

Embodiments of the present disclosure are explained with reference to the accompanying drawings.

FIG. 1 is a diagram representing an example environment 100 related to automatically generating new ML projects based on existing ML projects, arranged in accordance with at least one embodiment described in the present disclosure. The environment 100 may include a modification module 120 configured to modify a pipeline skeleton 102 to generate a concrete pipeline 122 that may be used for implementation of a new ML project 115. In some embodiments, the modification module 120 may be configured to modify the pipeline skeleton 102 based existing ML projects 110 that may be included in an ML project corpus 105.

The ML project corpus 105 may include any suitable repository of existing ML projects 110. Each existing ML project 110 may include electronic data that includes at least a dataset 109, an ML task defined on the dataset, and an ML pipeline 111 (e.g., a script or program code) that is configured to implement a sequence of operations to train an ML model for the ML task and to use the ML model for new predictions. In some embodiments, each existing ML project 110 may include a computational notebook, which may be a computational structure used to develop and/or represent the corresponding ML pipelines, especially during the development phase. One example of a computational notebook is a Jupyter notebook.

In some embodiments, the ML project corpus 105 may include one or more OSS ML project databases, which may be large-scale repositories of existing ML projects. Some examples of large-scale repositories of existing ML projects 110 include, but are not limited to, Kaggle and GitHub.

Additionally or alternatively, in some embodiments, the existing ML projects 110 of the ML project corpus 105 may be curated and selected from one or more of the OSS ML project databases. The curation may be such that the ML project corpus 105 may be a large-scale corpus of cleaned, high-quality, indexed existing ML projects that may be employed in an automated "search-and-adapt" style workflow. The curation may be performed according to any suitable technique.

The pipeline skeleton 102 may include a set of functional blocks that may indicate the functionality that may be used to accomplish a new ML task 108 with respect to a new dataset 106 of the new ML project 115. In some embodiments, the functional blocks may not be ordered in the pipeline skeleton 102. Additionally or alternatively, the pipeline skeleton 102 may include one or more functional blocks that may be relatively redundant as compared to one or more other functional blocks of the pipeline skeleton 102.

In some embodiments, the pipeline skeleton 102 may be generated using a pipeline skeleton model 104. The pipeline skeleton model 104 may include one or more ML models trained to learn the mapping between dataset meta-features and functional block semantic labels (e.g., based on existing ML project information included with the existing ML projects 110 of the ML project corpus 105). For example, given the meta-features of the new dataset 106, the pipeline skeleton model 104 may identify, using the mapping, functional blocks that correspond to meta-features of the new dataset 106 and may synthesize the pipeline skeleton 102 accordingly. Additionally or alternatively, the pipeline skeleton 102 may be manually generated or by any other suitable technique.

In some embodiments, the pipeline skeleton model 104 may include a multivariate multi-valued classifier that is trained prior to generating the pipeline skeleton. The multivariate multi-valued classifier may be configured to map meta-features of a new dataset into an unordered set of functional blocks (denoted by corresponding semantic labels) that the pipeline skeleton should contain. This training may include performing a relationship mapping such as described below with respect to FIG. 2. For example, the training may include extracting dataset features from existing datasets of existing ML projects correlated to particular semantic labels, identifying a set of all labels from the functional blocks of the existing ML projects, preparing training data comprising an input vector having the dataset features and a binary output tuple that denotes a presence or absence of each of the set of all labels, and training the pipeline skeleton model 104 to learn mappings between the dataset features and corresponding labels of the set of all labels. In some embodiments, the training of the pipeline skeleton model 104 may enable the pipeline skeleton model 104 to use salient properties of the new dataset 106 and the new ML task 108 (meta-features) to predict a set of functional blocks as the skeleton blocks of the pipeline skeleton.

The modification module 120 may include code and routines configured to enable a computing device to perform one or more operations. Additionally or alternatively, the modification module 120 may be implemented using hardware including a processor, a microprocessor (e.g., to perform or control performance of one or more operations), a field-programmable gate array (FPGA), or an application-specific integrated circuit (ASIC). In some other instances, the modification module 120 may be implemented using a combination of hardware and software. In the present disclosure, operations described as being performed by the modification module 120 may include operations that the modification module 120 may direct a corresponding system to perform.

The modification module 120 may be configured to obtain the pipeline skeleton 102 and modify the pipeline skeleton 102 to generate the concrete pipeline 122. For example, in some embodiments, the modification module 120 may be configured to modify the pipeline skeleton 102 to refine the pipeline skeleton 102. For example, the modification module 120 may refine the pipeline skeleton 102 by determining to which portions of the new dataset 106 to apply the different functional blocks of the pipeline skeleton 102. Additionally or alternatively, the modification module 120 may be configured to identify an order for the functional blocks included in the pipeline skeleton 102 as part of the refining. In these or other embodiments, the modification module 120 may be configured to refine the pipeline skeleton by performing a redundancy analysis on the pipeline skeleton 102. Additionally or alternatively, the modification module 120 may remove one or more functional blocks from the pipeline skeleton 102 based on the redundancy analysis. In some embodiments, the modification module 120 may be configured to modify the pipeline skeleton 102 to generate a refined pipeline skeleton such as described below with respect to FIGS. 2-6.

In these or other embodiments, the modification module 120 may be configured to identify code snippets from the existing ML pipelines 111 that may be used to instantiate the functional blocks of the pipeline skeleton 102 and accordingly concretize the pipeline skeleton 102 into the concrete pipeline 122. Additionally or alternatively, the modification module 120 may be configured to determine an adaptability of the identified code snippets with respect to adapting the identified code snippets for use as part of the concrete pipeline 122. In these or other embodiments, the modification module 120 may be configured to generate one or more candidate pipelines that may be different concrete pipelines of the pipeline skeleton 102. The candidate pipelines may each include different instantiations of same functional blocks of the pipeline skeleton 102 using different identified code snippets. Additionally or alternatively, the modification module 120 may be configured to analyze the candidate pipelines to determine performance of the candidate pipelines. In these or other embodiments, the modification module 120 may select one of the candidate pipelines as the concrete pipeline 122 based on the performance determinations. In some embodiments, the modification module 120 may be configured to identify, select, and implement code snippets for generation and selection of the concrete pipeline 122 such as described below with respect to FIGS. 7-12.

The modification module 120 may accordingly be configured to modify the pipeline skeleton 102 to generate the concrete pipeline 122 for use as part of the new ML project 115. The operations may improve automation of the generation and implementation of the new ML projects by computer systems, which may improve the ability to apply machine learning to an increased number of projects.

Modifications, additions, or omissions may be made to FIG. 1 without departing from the scope of the present disclosure. For example, the environment 100 may include more or fewer elements than those illustrated and described in the present disclosure.

Figure 2:
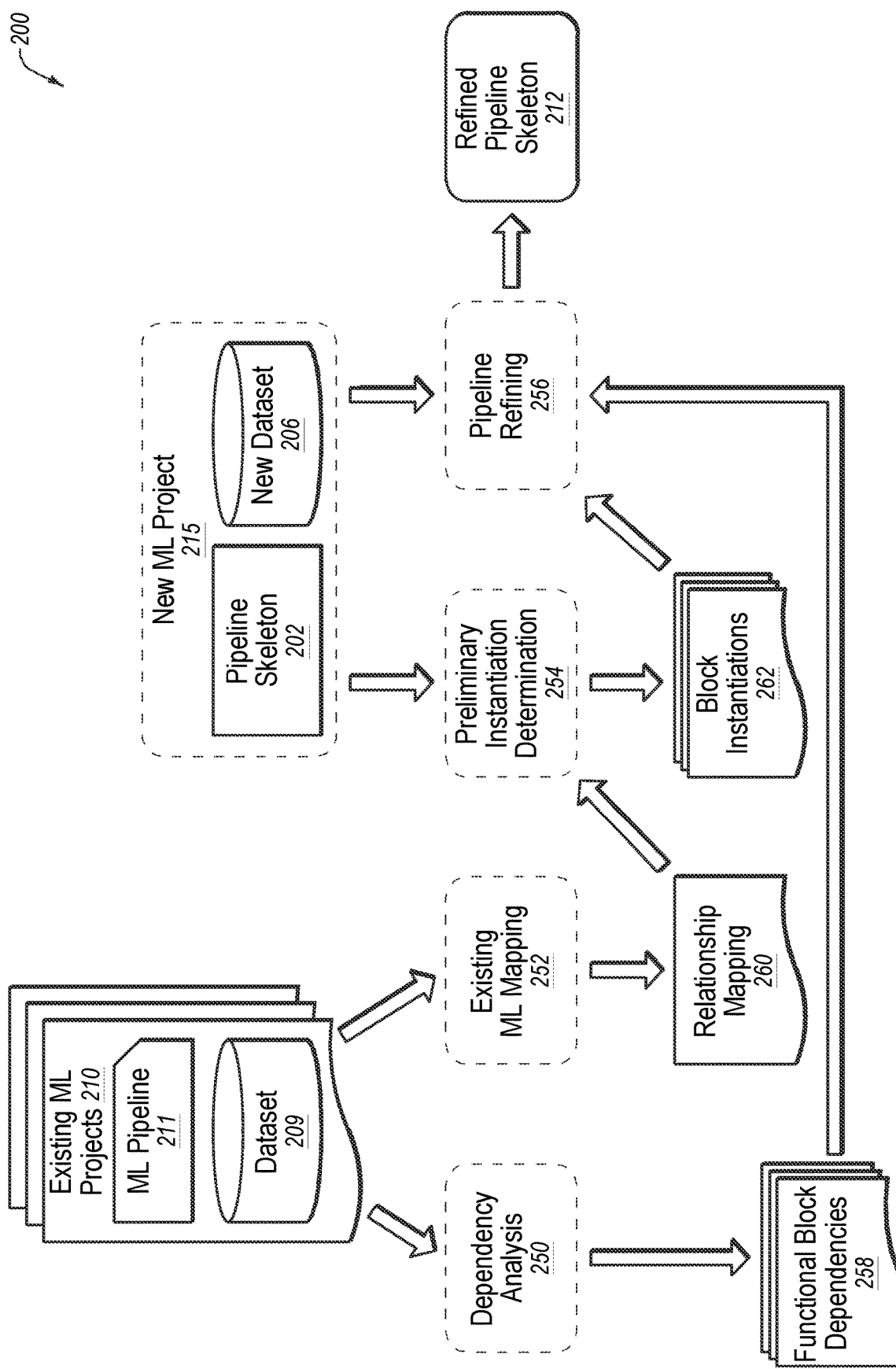
FIG. 2 illustrates an example set of operations that may be performed to modify a pipeline skeleton of a new machine learning project to generate a refined pipeline skeleton.
Figure 3:
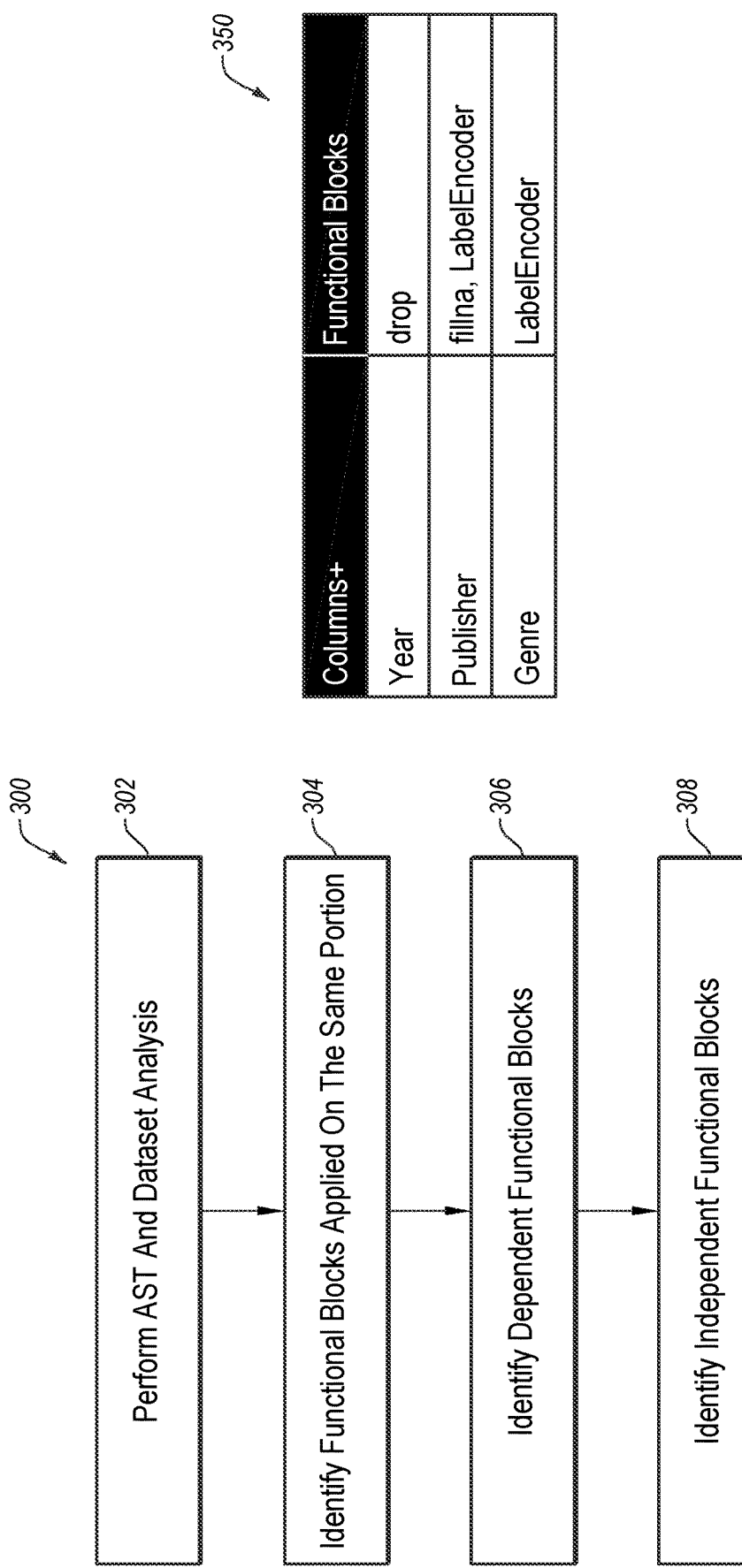
FIG. 3A is a flowchart of an example method of determining dependencies of functional blocks.
FIG. 3B illustrates an example table that may indicate usage of three different functional blocks with respect to different columns of a dataset.

FIG. 2 illustrates an example set of operations 200 ("operations set 200") that may be performed to modify a pipeline skeleton 202 of a new ML project 215 to generate a refined pipeline skeleton 212. The operations set 200 may be performed by any suitable system or device. For example, one or more operations of the operations set 200 may be performed by or directed for performance by the modification module 120 of FIG. 1. Additionally or alternatively, the operations set 200 may be performed by a computing system (e.g., as directed by the modification module 120) such as the computing system 1202 of FIG. 12.

In general, the operations set 200 may be configured to perform one or more operations with respect to the pipeline skeleton 202, a new dataset 206, and one or more existing ML projects 210 to generate the refined pipeline skeleton 212. In some embodiments, the operations set 200 may include a dependency analysis 250, an existing ML mapping 252, an instantiation determination 254, and a pipeline refining 256 to generate the refined pipeline skeleton 212.

The pipeline skeleton 202 may be analogous to the pipeline skeleton 102 of FIG. 1 and may include a set of functional blocks (referred to as "skeleton blocks") associated with a new ML project 215. The new dataset 206 may also be part of the new ML project 215 and may be analogous to the new dataset 106 of FIG. 1. The existing ML projects 210 may be analogous to the existing ML projects 110 of FIG. 1 and may include existing ML pipelines 211 and corresponding existing datasets 209, which may be respectively analogous to the existing ML pipelines 111 and corresponding existing datasets 109 of FIG. 1.

The dependency analysis 250 may include operations that may be used to determine one or more functional block dependencies 258. The functional block dependencies 258 may indicate whether pairs of functional blocks are dependent on each other based on whether each of the functional blocks of the respective pairs are applied to a same portion of a same dataset. In some embodiments, the dependency analysis 250 may determine the functional block dependencies 258 based on the usage of functional blocks of one or more of the existing ML pipelines 211. The functional blocks of the existing ML pipelines 211 may be referred to as "existing functional blocks".

In some embodiments, the usage determination of the dependency analysis 250 may include determining to which portions of the existing datasets 209 the existing functional blocks are applied. For example, the dependency analysis 250 may include determining to which columns of the existing datasets 209 the existing functional blocks are applied.

In these or other embodiments, the dependency analysis 250 may include determining which existing functional blocks are applied to the same portions of the existing datasets 209. In these or other embodiments, existing functional blocks that are applied to a same portion may be deemed as being dependent with respect to each other in the functional block dependencies 258. Conversely, different existing functional blocks that are not identified as ever being applied to a same portion may be deemed as being independent with respect to each other.

For example, a first functional block and a second functional block of the existing functional blocks may both be applied to a particular column of a particular existing dataset 209. In some embodiments, the functional block dependencies 258 may accordingly indicate that the first functional block and the second functional block are a dependent pair. As another example, the first functional block and a third functional block of the existing functional blocks may never be identified as being applied to a same column of any of the existing datasets 209. In some embodiments, the functional block dependencies 258 may accordingly indicate the first functional block and the third functional block as an independent pair of functional blocks.

In some embodiments, the dependency analysis 250 may be performed with respect to multiple functional block pairs of the existing functional blocks. In these or other embodiments, the dependency analysis 250 may be performed for each possible pair of existing functional blocks. Additionally or alternatively, the functional block dependencies 258 may include the indications of all of the different dependencies. It is understood that the existing ML pipelines 211 may include multiple instances of a same existing functional block such that reference to "every pair" of existing functional blocks may not necessarily include every pair of every instance of the existing functional blocks but instead may refer to every pair of every different existing functional block type. In some embodiments, the dependency analysis 250 may include one or more operations described below with respect to FIGS. 3A and 3B. As discussed further below, the functional block dependencies 258 may be used in the pipeline refining 256 in some embodiments.

The existing ML mapping 252 ("ML mapping 252") may include operations that generate a relationship mapping 260 ("relationship mapping 260"). The relationship mapping 260 may indicate relationships between certain features of datasets and the usage of functional blocks with respect to portions of the datasets having those features. In some embodiments, the ML mapping 252 may determine the mapping 260 based on the usage of the existing functional blocks of one or more existing ML pipelines 211.

In some embodiments, the usage determination of ML mapping 252 may include determining usage information that indicates to which portions of the existing datasets 209 the existing functional blocks are applied. For example, the ML mapping 252 may include determining to which columns of the existing datasets 209 the existing functional blocks are applied. In some embodiments, this information may be obtained from the same determination made with respect to the dependency analysis 250.

In these or other embodiments, the ML mapping 252 may include identifying one or more meta-features of the different portions of the existing datasets 209 "dataset features". The dataset features may include, but are not limited to, a number of rows, a number of features, a presence of number, a presence of missing values, a presence of numbers, a presence of a number category, a presence of a string category, a presence of text, and a type of target.

In some embodiments, the ML mapping 252 may include determining relationships between the existing functional blocks and the dataset features of the portions at which the existing functional blocks are applied. The relationships may be determined based on the usage information and may indicate how likely a particular functional block may be to be used with respect to portions having certain dataset features. The ML mapping 252 may generate the relationship mapping 260 based on the determined relationships. For example, the relationship mapping 260 may provide a mapping that indicates to which dataset features different functional blocks correspond, as determined from the relationships.

In some embodiments, the ML mapping 252 may include one or more operations described below with respect to FIG. 4. As discussed further below, the relationship mapping 260 may be used in the instantiation determination 254 in some embodiments.

As discussed above, in some instances the pipeline skeleton 202 may include a set of skeleton blocks indicating operations to perform for the new ML project 215, but may not indicate to which portions of the new dataset 206 to apply the different skeleton blocks. The instantiation determination 254 may include operations that determine to which portions (e.g., columns) of the new dataset 206 to apply the skeleton blocks. In some embodiments, the instantiation determination 254 may be determined by applying the relationship mapping 260 to the skeleton blocks and the new dataset 206 based on the dataset features of the different portions of the new dataset 206. In some embodiments, the instantiation determination 254 may generate block instantiations 262, which may indicate to which portions of the new dataset 206 to apply the different skeleton blocks based on the determinations. In some embodiments, the instantiation determination 254 may include one or more operations described below with respect to FIG. 5. As discussed further below, the instantiation determination 254 may be used in the pipeline refining 256 in some embodiments.

The pipeline refining 256 may include operations related to refining the pipeline skeleton 202. For example, the pipeline refining 256 may include removing one or more skeleton blocks from the pipeline skeleton 202. In these or other embodiments, the removal of one or more of the skeleton blocks may be based on a redundancy analysis that may use the functional block dependencies 258. Additionally or alternatively, the removal of one or more of the skeleton blocks may be based on the block instantiations 262. In some embodiments, the removal of one or more of the skeleton blocks may include one or more operations described below with respect to FIG. 6.

In these or other embodiments, the pipeline refining 256 may include determining an order of execution of the skeleton blocks. This order may be determined by first inferring a partial order of block ordering from the ML Pipelines 211 in the existing ML projects 210. For example, in some embodiments, this partial order may be represented, as a graph, where there is a node for each functional block appearing in any of the ML Pipelines 211. In these or other embodiments, the graph may include edges between the nodes that indicate an order of execution of the corresponding functional blocks. For example, a directed edge from a first node to a second node may be included in instances in which a first functional block corresponding to the first node occurs before a second functional block corresponding to the second node in every ML Pipeline 211 in which the two blocks co-occur. This partial order may then be used to determine an order of execution of the skeleton blocks (e.g., to determine a total order on the skeleton functional blocks, as any one that is consistent with the inferred partial order).

Additionally or alternatively, the pipeline refining 256 may include annotating the pipeline skeleton 202 with one or more instantiations selected from the block instantiations 262. For example, the block instantiations 262 that relate to skeleton blocks that are remaining in the refined pipeline skeleton 212 after the pipeline refining 256 may be indicated in the refined pipeline skeleton 212.

The operations set 200 may accordingly be configured to modify the pipeline skeleton 102 to generate the refined pipeline skeleton 212. The refined pipeline skeleton 212 may be better suited for instantiation than the pipeline skeleton 202 by indicating an execution ordering for the skeleton blocks and/or removing skeleton blocks that may be redundant or not needed.

Modifications, additions, or omissions may be made to FIG. 2 without departing from the scope of the present disclosure. For example, the operations set 200 may include more or fewer operations than those illustrated and described in the present disclosure. Further, the order of the description of the operations of the operations set 200 does not mean that the operations must be performed in the described order. In addition, in some instances, a same operation may be described with respect to different portions of the operations set 200 (e.g., the usage determination with respect to the dependency analysis 250 and the ML mapping 252), but in some instances may only be performed once and used for the different portions of the operations set 200.

FIG. 3A is a flowchart of an example method 300 of determining dependencies of functional blocks, according to at least one embodiment described in the present disclosure. The method 300 may be performed by any suitable system, apparatus, or device. For example, the modification module 120 of FIG. 1 or the computing system 1202 of FIG. 12 (e.g., as directed by a modification module) may perform one or more of the operations associated with the method 300. Further, as indicated above, in some embodiments, one or more of the operations of the method 300 may be performed with respect to the dependency analysis 250 of FIG. 2. Although illustrated with discrete blocks, the steps and operations associated with one or more of the blocks of the method 300 may be divided into additional blocks, combined into fewer blocks, or eliminated, depending on the particular implementation.

The method 300 may include, at block 302, performing a dataset and Abstract Syntax Tree (AST) analysis of one or more pipelines and one or more corresponding datasets of one or more ML projects. For example, an AST analysis may be performed with respect to on or more existing pipelines and the respective existing datasets of one or more existing ML projects stored in a corpus. The AST analysis may include generating respective AST's of the existing pipelines based on the code of the existing pipelines. The dataset analysis may include identifying names of portions of the existing datasets (e.g., names of columns of the existing datasets). The AST may indicate which code elements may be related to certain functional blocks. For example, the AST may indicate calls to application program interfaces (API's) that correspond to the functional blocks. Further, the AST may indicate which portions of the dataset may be targets for certain operations and API calls.

Based on these indications, the dataset and AST analysis may include identifying usage of the existing functional blocks with respect to different portions of the existing dataset. For example, it may be determined as to which portions of the existing dataset (e.g., which columns) the different existing functional blocks may be applied. For instance, FIG. 3B illustrates an example table 350 that may indicate usage of three different functional blocks with respect to different columns of a dataset, that may be determined based on the dataset and AST analysis. In the example of FIG. 3B, the table 350 indicates that the functional block "drop" is applied to the column "Year" of a dataset. In the example of FIG. 3B, the table 350 also indicates that the functional block "Lab elEncoder" is applied to the columns "Publisher" and "Genre" of the dataset. In the example of FIG. 3B, the table 350 further indicates that the functional block "fillna" is applied to the column "Publisher" of the dataset.

Returning to FIG. 3A, at block 304, functional blocks that are applied to the same portion of a dataset may be identified. For example, with respect to the example of FIG. 3B, the functional blocks "LabelEncoder" and "fillna" may be identified as being applied to the same column of "Publisher."

At block 306, dependent functional blocks may be identified based on the identification performed at block 304. For example, functional blocks that are applied to a same portion may be identified as being dependent with respect to each other. For instance, the functional blocks "fillna" and "LabelEncoder" of FIG. 3B may be identified as a dependent pair based on both being applied to the column "Publisher."

At block 308, independent functional blocks may also be identified based on the identification performed at block 304. For example, functional blocks that are not identified as applying to a same portion may be identified as being independent with respect to each other. For instance, the functional blocks "drop" and "LabelEncoder" of FIG. 3B may be identified as an independent pair based on them not being applied to any of the same columns.

In some embodiments, the dependency analysis of blocks 306 and 308 may be performed with respect to multiple functional block pairs of the existing functional blocks. In these or other embodiments, the dependency analysis of blocks 306 and 308 may be performed for each possible pair of existing functional blocks. Further, such an analysis may be performed for each ML pipeline 211 and dataset 209 of FIG. 2 and the results aggregated over all the pipelines, such that a pair of blocks is deemed dependent if it is deemed dependent in one or more pipelines where the blocks co-occur, and independent otherwise.

Modifications, additions, or omissions may be made to the method 300 without departing from the scope of the present disclosure. For example some of the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 4:
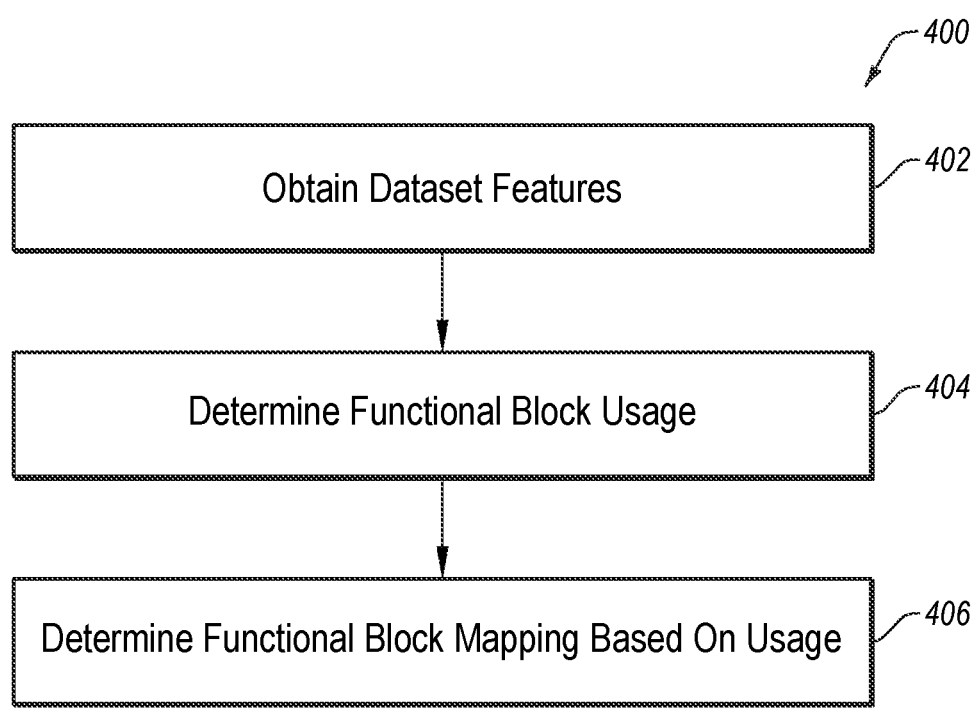
FIG. 4 is a flowchart of an example method of determining relationship mapping between functional blocks and dataset features.

FIG. 4 is a flowchart of an example method 400 of determining relationship mapping between functional blocks and dataset features, according to at least one embodiment described in the present disclosure. The method 400 may be performed by any suitable system, apparatus, or device. For example, the modification module 120 of FIG. 1 or the computing system 1202 of FIG. 12 (e.g., as directed by a modification module) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

In general, the method 400 may be configured to determine usage of existing functional blocks of existing ML pipelines with respect to features of the portions of the existing datasets to which the existing functional blocks are applied. The usage may be used to determine mappings between functional blocks and dataset features, which may indicate to which dataset features the functional blocks may correspond. Further, as indicated above, in some embodiments, one or more of the operations of the method 400 may be performed with respect to the ML mapping 252 of FIG. 2.

The method 400 may include a block 402 at which dataset features may be obtained. For example, in some embodiments, one or more existing datasets of existing ML projects may be obtained. In these or other embodiments, one or more features of the existing datasets may be obtained. For example, one or more meta-features of the existing datasets may be obtained. In these or other embodiments, different portions of the existing datasets (e.g., different columns) may have different features. In these or other embodiments, identification of the dataset features may also include identifying which portions have which features. In these or other embodiments, the identification of the different dataset features may be based on semantic labels that may be applied to the different portions having the different dataset features. The semantic labels may indicate the corresponding dataset features of the corresponding portions.

In some embodiments, the method 400 may include a block 404, at which usage of the functional blocks with respect to the dataset features may be determined. For example, in some embodiments, determining the usage may include determining a number of times the respective existing functional blocks are used with respect to different portions having the respective dataset features (also referred to as "occurrences of the functional blocks"). For example, the number of times a particular functional block is used with respect to portions having a given dataset feature may be determined.

As another example, determining the usage may include determining a frequency of use of the functional blocks with respect to portions having the respective dataset features. For instance, the number of times the particular functional block is used with respect to portions having the given dataset feature may be compared against the total number of dataset portions having the given dataset feature to determine a usage frequency (e.g., usage percentage) of the particular functional block with respect to dataset portions having the given dataset feature.

In some embodiments, determining the usage may include determining one or more conditional probabilities based on the usage. The conditional probabilities may indicate a likelihood that a corresponding functional block may be applied to dataset portions having certain dataset features. For example, a first conditional probability may be determined for a particular functional block with respect to a first dataset feature. The first conditional probability may be determined based on the usage of the particular functional block with dataset portions having the first dataset feature and may indicate how likely the particular functional block may be used in dataset portions having the first dataset feature. A second conditional probability may be determined for the particular functional block with respect to a second dataset feature as well. In some embodiments, a different conditional probability may be determined with respect to each functional block and each dataset feature.

In some embodiments, determining the usage information may be based on an AST and dataset analysis such as described above with respect to FIG. 3A. Additionally or alternatively, the identified dataset features may be used to determine the features of the portions to which the functional blocks are applied.

At block 406, mappings between dataset features and functional blocks may be determined based on the determined usage. For example, in response to one or more usage factors with respect to a certain functional block and a given dataset feature satisfying a threshold, the certain functional block and the given dataset feature may be mapped to each other as corresponding to each other.

For instance, a first functional block may be determined as being used a first number of times with respect to dataset portions having a first dataset feature. In addition, the first functional block may be determined as being used a second number of times with respect to dataset portions having a second dataset feature. In these or other embodiments, the first number of times may satisfy an occurrence threshold, but the second number of times may not satisfy the occurrence threshold. In these or other embodiments, the first functional block may be mapped to the first dataset feature but not the second dataset feature.

As another example, a second functional block may be determined as having a first conditional probability with respect to the first dataset feature and may be determined as having a second conditional probability with respect to a second dataset feature. In some embodiments, the second conditional probability may satisfy a probability threshold, but the first conditional probability may not. In these or other embodiments, the second functional block may accordingly be mapped to the second dataset feature but not the first dataset feature.

In these or other embodiments, the mappings may indicate the determined correspondences regardless of thresholds. For instance, in some embodiments, the mappings may indicate the condition probabilities, occurrences, and/or usage frequencies of each of the functional blocks with respect to each of the different features.

Modifications, additions, or omissions may be made to the method 400 without departing from the scope of the present disclosure. For example some of the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 5:
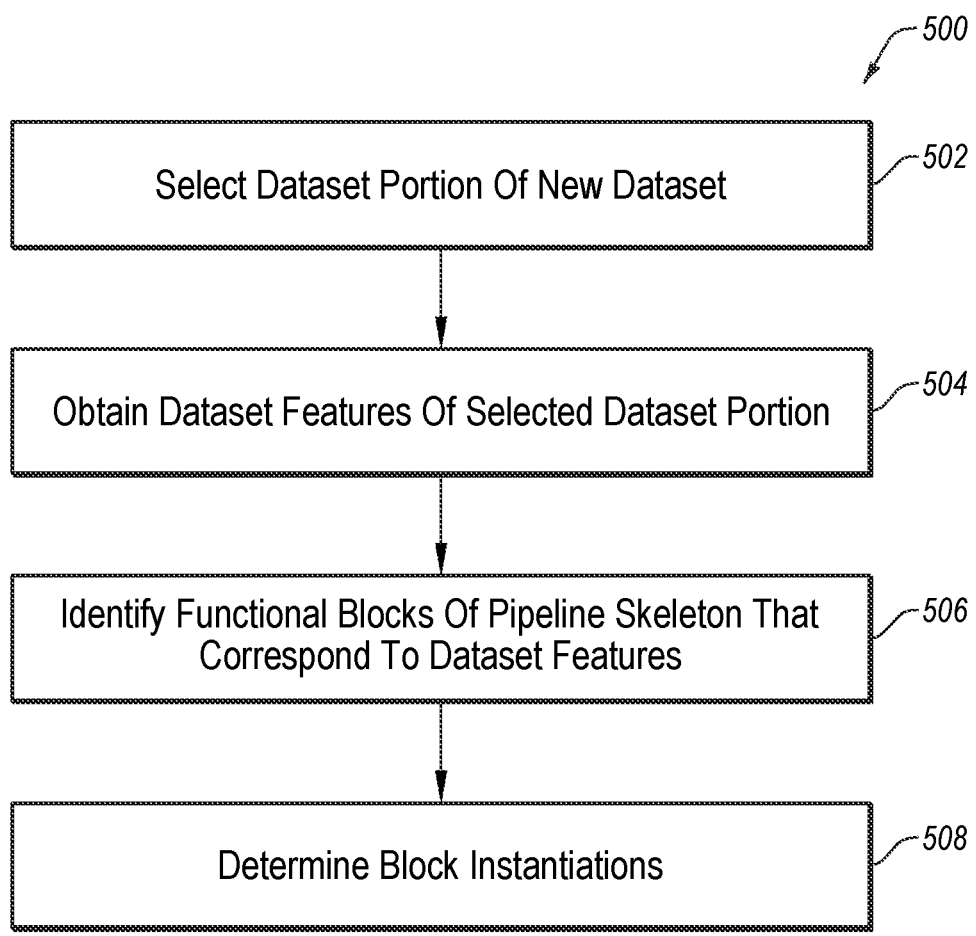
FIG. 5 is a flowchart of an example method of determining block instantiations for a pipeline skeleton.

FIG. 5 is a flowchart of an example method 500 of determining block instantiations for a pipeline skeleton, according to at least one embodiment described in the present disclosure. The method 500 may be performed by any suitable system, apparatus, or device. For example, the modification module 120 of FIG. 1 or the computing system 1200 of FIG. 12 (e.g., as directed by a modification module) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation. Further, as indicated above, in some embodiments, one or more of the operations of the method 500 may be performed with respect to the instantiation determination 254 of FIG. 2.

The method 500 may include a block 502, at which a dataset portion of a new dataset may be selected. For example, a column of the new dataset may be selected. The new dataset may be the dataset for which a pipeline skeleton has been generated.

At block 504, one or more dataset features of the selected portion may be obtained. For example, one or more meta-features of the selected portion may be determined.

At block 506, functional blocks of the pipeline skeleton ("skeleton blocks") that correspond to the dataset features of the selected portion may be identified. In some embodiments, the corresponding skeleton blocks may be identified based on a relationship mapping, such as the relationship mapping 260 of FIG. 2 or that described with respect to FIG. 4. For example, the selected portion may have a first dataset feature that is indicated as corresponding to a first functional block in the relationship mapping. A skeleton block of the pipeline skeleton that is the same as the first functional block (e.g., has a same functionality) may thus be identified as corresponding to the selected portion of the new dataset.

As another example, the relationship mapping may indicate the usage frequencies, conditional probabilities, and/or occurrences of different functional blocks with respect to different dataset features. In these or other embodiments, the correspondences may be based on the dataset features of the selected portion corresponding to functional blocks according to a certain threshold. For example, relationship mapping may indicate that a second functional block may have a conditional probability with respect to a second dataset feature of the selected portion. In these or other embodiments, a skeleton block that corresponds to the second functional block may be mapped to the selected portion accordingly. By contrast, a skeleton block that corresponds to a third functional block having a conditional probability with respect to the second dataset feature that does not satisfy the probability threshold may not be mapped to the selected portion.

At block 508, one or more block instantiations may be determined for the selected portion. As indicated above, the block instantiations may indicate which skeleton blocks to apply to the selected portion. In some embodiments, the block instantiations may be determined based on the correspondences determined at block 506. For example, the correspondences determined at block 506 may indicate that a first skeleton block and a second skeleton block correspond to the selected portion. A first block instantiation may accordingly be determined that indicates that the first skeleton block is to be applied to the selected portion. Additionally, a second block instantiation that indicates that the second skeleton block is to be applied to the selected portion may also be determined.

In some embodiments, the method 500 may be performed for multiple portions of the new dataset. In these or other embodiments, the method 500 may be performed for every different portion (e.g., each column) of the new dataset. As such, in some embodiments, all of the different portions of the new dataset may be mapped to one or more skeleton blocks through the generation of the block instantiations.

Modifications, additions, or omissions may be made to the method 500 without departing from the scope of the present disclosure. For example some of the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 6:
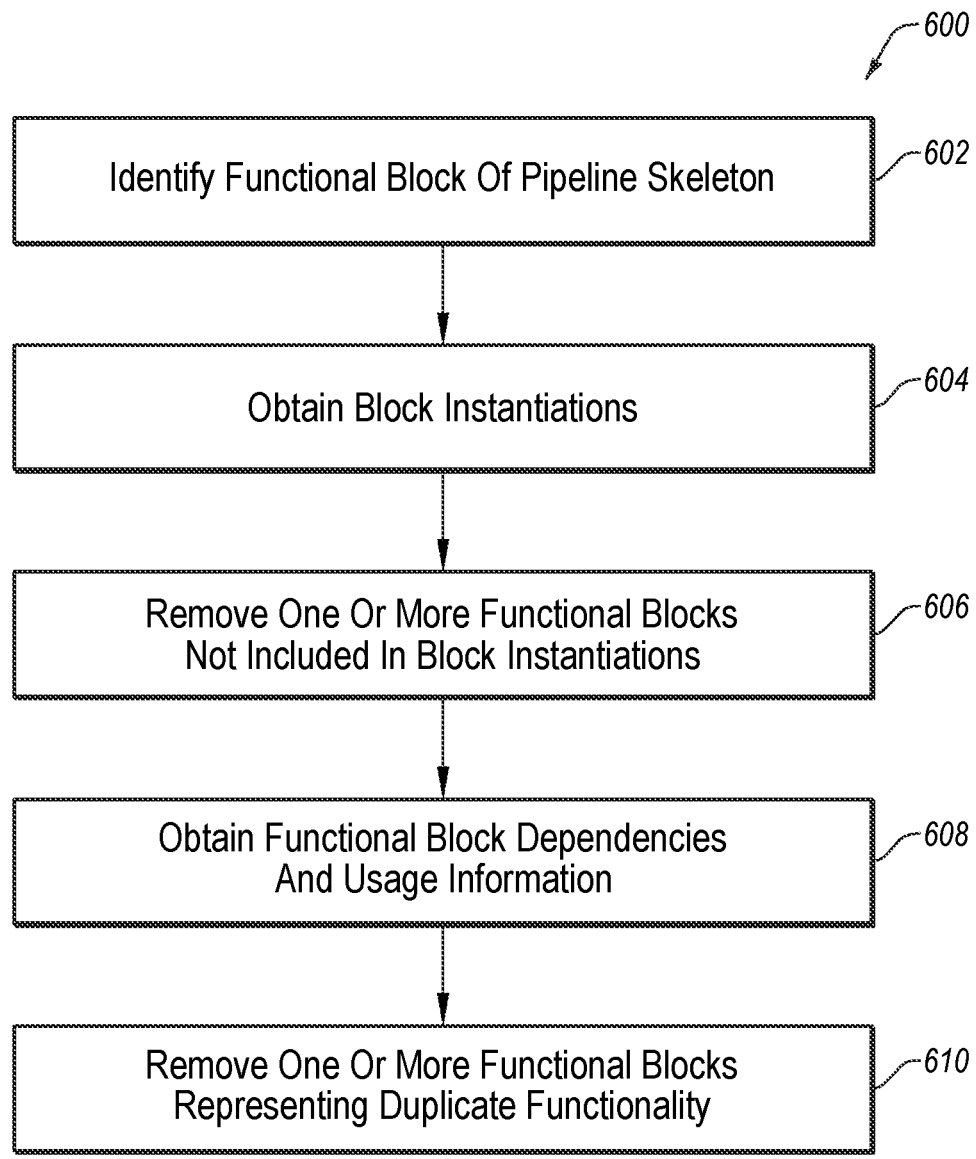
FIG. 6 is a flowchart of an example method of refining a pipeline skeleton into a refined skeleton.

FIG. 6 is a flowchart of an example method 600 of refining a pipeline skeleton into a refined skeleton, according to at least one embodiment described in the present disclosure. The method 600 may be performed by any suitable system, apparatus, or device. For example, the modification module 120 of FIG. 1 or the computing system 1202 of FIG. 12 (e.g., as directed by a modification module) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

In general, the method 600 may be configured to remove one or more skeleton blocks from the pipeline skeleton. Additionally or alternatively, the method 600 may be configured to determine an execution order of the skeleton blocks. In these or other embodiments, the method 600 may include annotating the pipeline skeleton with one or more instantiations selected from the block instantiations determined at the method 500. Further, as indicated above, in some embodiments, one or more of the operations of the method 600 may be performed with respect to the pipeline refining 256 of FIG. 2.

The method 600 may include a block 602, at which the functional blocks of the pipeline skeleton ("skeleton blocks") may be identified. At block 604, block instantiations such as those determined using the method 500 may be obtained.

At block 606, one or more skeleton blocks may be removed from the pipeline skeleton according to the block instantiations. For example, in some embodiments, skeleton blocks that are not included in any of the block instantiations may be removed. In these or other embodiments, all the skeleton blocks that are not included in the block instantiations may be removed.

At block 608, functional block dependencies may be obtained. For example, functional block dependencies determined based on the method 300 may be obtained. Additionally or alternatively, at block 608 usage information associated with existing functional blocks of one or more existing ML pipelines of one or more existing ML projects may be obtained. For example, the usage information may be similar or analogous to that determined with respect to block 404 of method 400 of FIG. 4. For example, the usage information may include occurrences of functional blocks with respect to respective dataset features, usage frequency with respect to respective dataset features, and/or conditional probabilities with respect to respective dataset features.

At block 610, one or more skeleton blocks may be removed. The removal may be such that one or more functional blocks representing duplicate functionality that are applied to a same portion of the new dataset may be removed.

In some embodiments, the removal may be based on the block instantiations and the dependencies and usage information. For example, using the functional block dependencies information, dependencies of the skeleton blocks may be determined by matching the skeleton blocks to the functional blocks indicated in the dependencies information (e.g., based on same functionality, same name, etc.). After the matching, the dependencies indicated in the dependencies information may be applied to the skeleton blocks according to the dependencies of the functional blocks that are identified as matching the skeleton blocks.

Additionally or alternatively, skeleton blocks that are mapped to the same portions of the new dataset may be identified from the block instantiations. In these or other embodiments, pairs of skeleton blocks mapped to the same portions ("mapped pairs") may be identified as being independent or dependent with respect to each other using the determined dependency information for the skeleton blocks. In response to a mapped pair of skeleton blocks being independent with respect to each other, one of the skeleton blocks of the mapped pair may be removed.

In some embodiments, the removal may be based on the usage information. For example, the skeleton block of the mapped pair with a lower condition probability may be removed. As another example, the skeleton block of the mapped pair with the lower number of occurrences or the lower usage frequency may be removed.

Modifications, additions, or omissions may be made to the method 600 without departing from the scope of the present disclosure. For example some of the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 7:
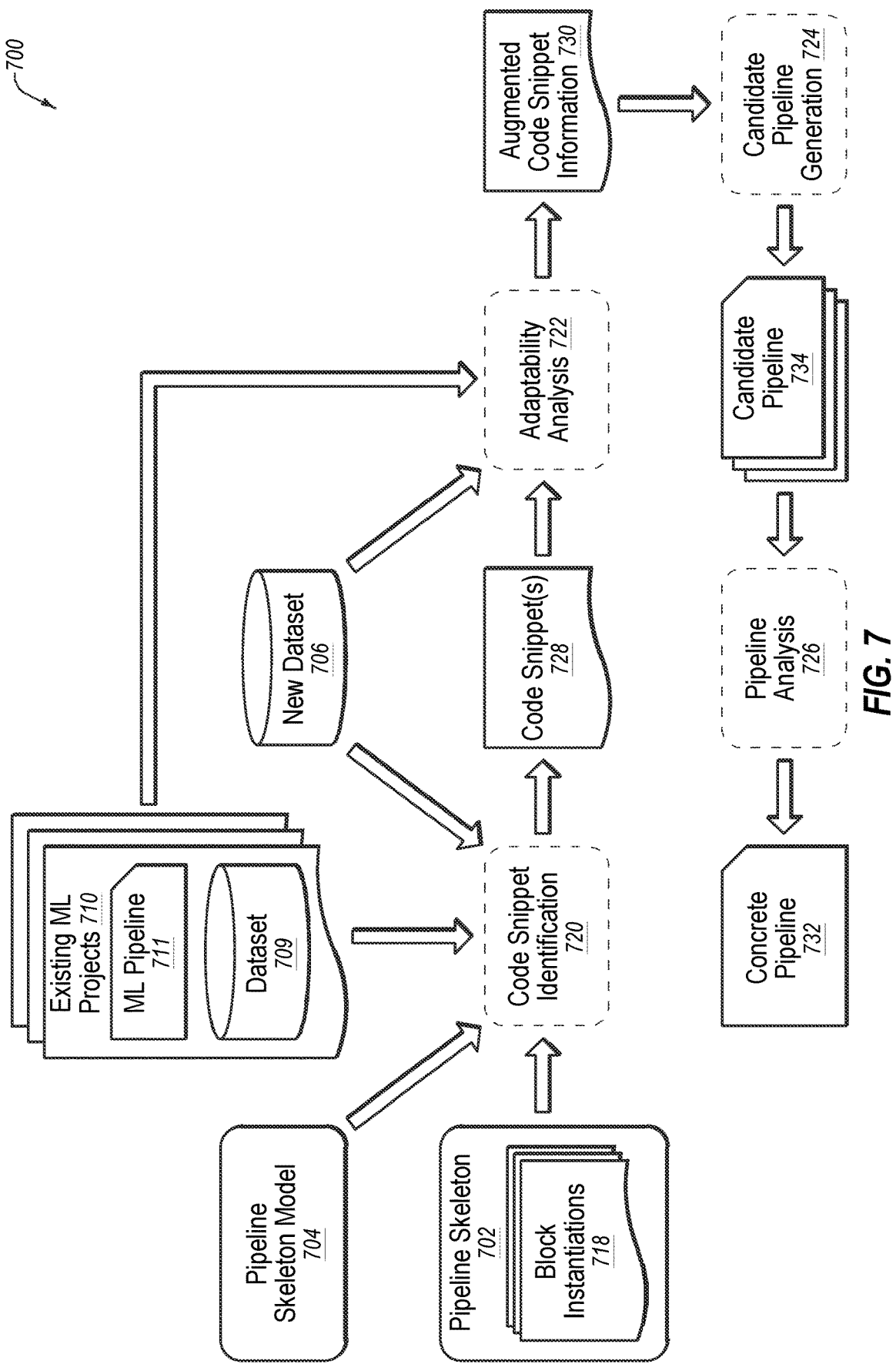
FIG. 7 illustrates an example set of operations that may be performed to instantiate a pipeline skeleton into a concrete pipeline skeleton.

FIG. 7 illustrates an example set of operations 700 ("operations set 700") that may be performed to instantiate a pipeline skeleton 702, according to one or more embodiments of the present disclosure. The operations set 700 may be performed by any suitable system or device. For example, one or more operations of the operations set 700 may be performed by or directed for performance by the modification module 120 of FIG. 1. Additionally or alternatively, the operations set 700 may be performed by a computing system (e.g., as directed by the modification module 120) such as the computing system 1202 of FIG. 12.

The operations set 700 may include one or more operations performed with respect to the pipeline skeleton 702, a pipeline skeleton model 704, one or more existing ML projects 710, and/or a new dataset 706 to instantiate the pipeline skeleton 702 into a concrete pipeline 732. In some embodiments, the operations set 700 may also include code snippet identification 720, an adaptability analysis 722, candidate pipeline generation 724, and a pipeline analysis 726 to instantiate the pipeline skeleton 702 into the concrete pipeline 732.

The pipeline skeleton 702 may include a set of functional blocks (referred to as "skeleton blocks") associated with a new ML project. In some embodiments, the pipeline skeleton 702 may be analogous to the pipeline skeleton 102 of FIG. 1. or the pipeline skeleton 202 of FIG. 2. Additionally or alternatively, the pipeline skeleton 702 may be analogous to the refined pipeline skeleton 212 of FIG. 2. In these or other embodiments, the pipeline skeleton 702 may include one or more block instantiations 718. The block instantiations 718 may be analogous to the block instantiations 262 of FIG. 2 in that the block instantiations 718 may indicate to which portions of the new dataset 706 (e.g., to which column) to apply which skeleton block of the pipeline skeleton 702.

The new dataset 706 may also be part of the new ML project and may be analogous to the new dataset 106 of FIG. 1. The existing ML projects 710 may be analogous to the existing ML projects 110 of FIG. 1 and may include existing ML pipelines 711 and corresponding existing datasets 709, which may be respectively analogous to the existing ML pipelines 111 and corresponding existing datasets 109 of FIG. 1. The pipeline skeleton model 704 may be configured to generate the pipeline skeleton 702 in some embodiments. The pipeline skeleton model 704 may be analogous to the pipeline skeleton model 104 of FIG. 1. The concrete pipeline 732 may be analogous to the concrete pipeline 122 of FIG. 1.

The code snippet identification may include operations that may be used to identify one or more code snippets 728. The code snippets 728 may include one or more existing code snippets from the existing ML pipelines 711. The existing code snippets that may be identified as the code snippets 728 may be identified as potentially being used to instantiate respective skeleton blocks of the pipeline skeleton 702.

In some embodiments, the code snippets 728 may be identified based on a similarity between the new dataset 706 and the existing datasets 709 to which the code snippets 728. The similarities may be determined based on similarities between one meta-features of the existing datasets 709 and of the new dataset 706. In some embodiments, the identification of the code snippets 728 based on the determined similarities may include one or more operations described below with respect to FIG. 8.

In these or other embodiments, the code snippets 728 may be identified based on an analysis of the generation of the pipeline skeleton 702 via the pipeline skeleton model 704. For example, it may be determined which training data of the pipeline skeleton model 704 was used to determine which functional blocks to include in the pipeline skeleton 702. In these or other embodiments, the identified training data may have been obtained from the existing ML projects 710. For example, the identified training data may exemplify correlations between specific features of existing datasets and the presence of specific existing functional blocks in the pipelines, which may cause the pipeline skeleton model 704 to include the specific functional blocks in the pipeline skeleton 702 predicted for new dataset 706. In these or other embodiments, the identified training data may therefore represent the most suitable instantiations of the functional blocks in the context of new dataset 706 in some instances. Additionally or alternatively, the identified training data may include or may be used to identify code snippets that instantiate the existing functional blocks of the identified training data. The code snippets associated with the identified training data may be useful for instantiating the pipeline skeleton 702. In some embodiments, the identification of the code snippets 728 based on the training data used to generate the pipeline skeleton 702 may include one or more operations described below with respect to FIG. 9.

The adaptability analysis 722 may include operations related to determining how suitable the code snippets 728 may be for adaptation for implementation with respect to the pipeline skeleton 702. The adaptability analysis 722 may include determining an element adaptability of the code snippets 728 based on program elements of the code snippets 728. Additionally or alternatively, the adaptability analysis 722 may include determining a dataflow adaptability of the code snippets 728 based on dataflows of the code snippets 728. In these or other embodiments, the adaptability analysis 722 may include determining a cardinality adaptability of the code snippets 728 based on a cardinality compatibility of the respective code snippets 728. In some embodiments, the adaptability analysis 722 may include determining a respective overall adaptability of the respective code snippets 728 based on a combination of two or more of the element adaptability, the dataflow adaptability, or the cardinality adaptability of the respective code snippets 728.

In some embodiments, the adaptability analysis may output augmented code snippet information 730 ("augmented information 730") about the code snippets 728. The augmented information 730 may include respective adaptability determinations for the respective code snippets 728.

In these or other embodiments, the augmented information 730 may include the code snippets 728. In some embodiments, the adaptability analysis 722 may include one or more operations described below with respect to FIG. 10.

Additionally or alternatively, the augmented information 730 may include rankings of the code snippets 728 with respect to each other. For example, different code snippets may be potential candidates for instantiation of a same skeleton block. In some embodiments, the different code snippets may be ranked with respect to each other regarding instantiation of the same skeleton block. In some embodiments, the different code snippets may be ranked such as described below with respect to FIGS. 8, 9, and/or 10.

The candidate pipeline generation 724 may include operations that may generate one or more candidate pipelines 734 based on the augmented information 730. The candidate pipelines 734 may each be a concretized instantiation of the pipeline skeleton 702 using a selected set of code snippets 728. The code snippets 728 may be selected based on the adaptability information included in the augmented information 730 in some embodiments. In these or other embodiments, the codes snippets 728 may be selected based on the rankings that may be included in the augmented information 730. In some embodiments, the candidate pipeline generation 724 may include one or more operations described below with respect to FIG. 11.

The pipeline analysis 726 may include operations that may analyze the candidate pipelines 734 to select one of the candidate pipelines 734 for use as the concrete pipeline 732. For example, in some embodiments, each of the candidate pipelines 734 may be applied to the new dataset 706 to determine a performance level of the respective candidate pipelines. In these or other embodiments, a particular candidate pipeline 734 may be selected as the concrete pipeline 732 based on the determined performance levels. In some embodiments, the pipeline analysis 726 may be performed using any suitable technique. Additionally or alternatively, in some embodiments, the new dataset 706 may be relatively large and data sampling (e.g., stratified data sampling) may be used to prune the new dataset 706 to reduce the amount of data used to analyze the candidate pipelines 734.

Modifications, additions, or omissions may be made to FIG. 7 without departing from the scope of the present disclosure. For example, the operations set 700 may include more or fewer operations than those illustrated and described in the present disclosure. Further, the order of the description of the operations of the operations set 700 does not mean that the operations must be performed in the described order. In addition, in some instances, a same operation may be described with respect to different portions of the operations set 700, but in some instances may only be performed once and used for the different portions of the operations set 700.

Figure 8:
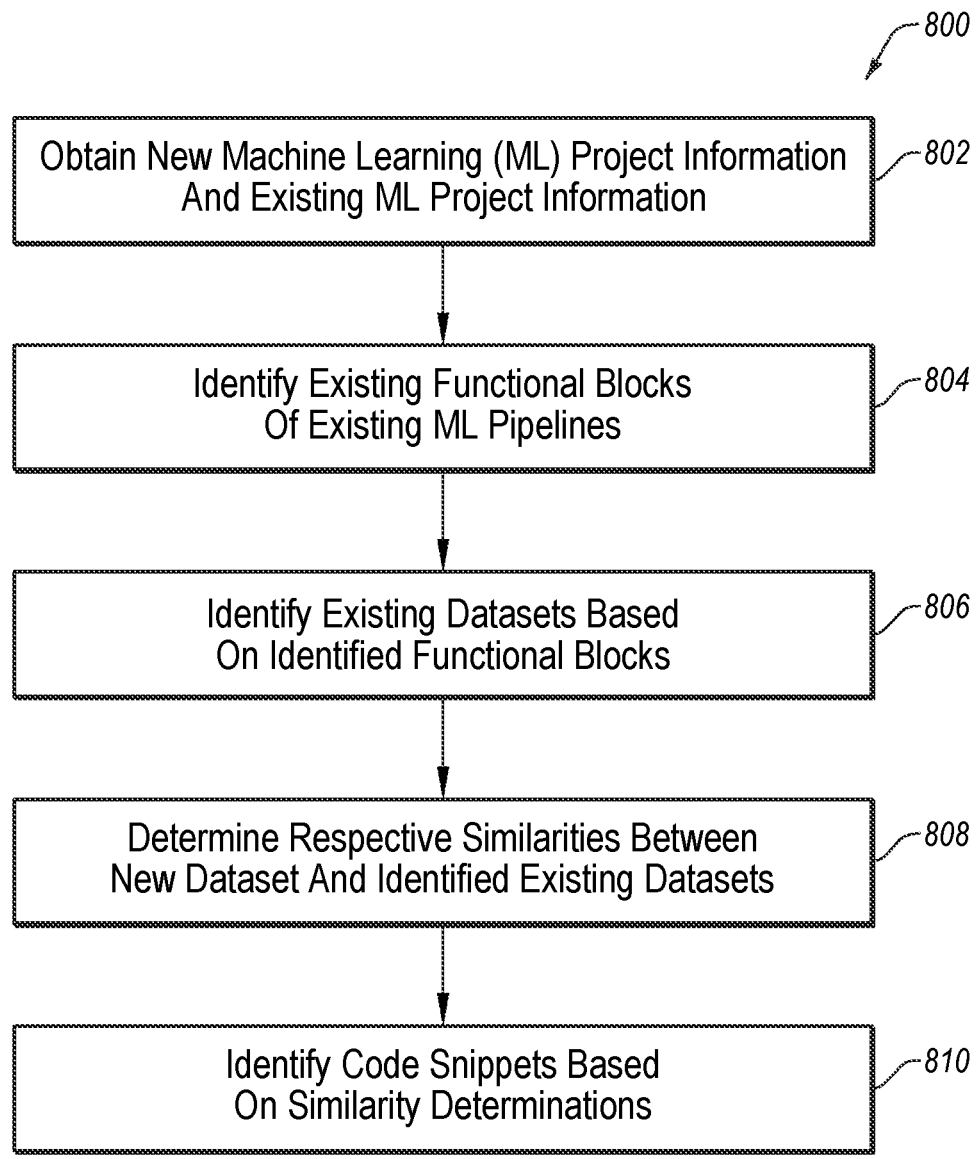
FIG. 8 is a flowchart of an example method of obtaining code snippets for instantiation of a pipeline skeleton.

FIG. 8 is a flowchart of an example method 800 of obtaining code snippets for instantiation of a pipeline skeleton, according to at least one embodiment described in the present disclosure. The method 800 may be performed by any suitable system, apparatus, or device. For example, the modification module 120 of FIG. 1 or the computing system 1202 of FIG. 12 (e.g., as directed by a modification module) may perform one or more of the operations associated with the method 800. Although illustrated with discrete blocks, the steps and operations associated with one or more of the blocks of the method 800 may be divided into additional blocks, combined into fewer blocks, or eliminated, depending on the particular implementation. Further, as indicated above, in some embodiments, one or more of the operations of the method 800 may be performed with respect to the code snippet identification 720 of FIG. 7.

The method 800 may include a block 802 at which information related to a new ML project may be obtained. The new ML information may include a new dataset of the new ML project and/or a pipeline skeleton of the new ML project. For example, the new ML information may include the pipeline skeleton 702 of FIG. 7 and/or the new dataset 706 of FIG. 7.

In these or other embodiments, information related to one or more existing ML projects may be obtained at block 802. The existing ML information may include one or more existing ML projects and corresponding information, such as the existing ML projects 710. For example, the existing ML information may include existing pipelines and/or existing datasets of the existing ML projects. Additionally or alternatively, the existing ML information may include the code of the existing ML pipelines. In these or other embodiments, the existing ML information may include usage information indicating as to which portions of the existing datasets different existing functional blocks and corresponding existing code snippets may be applied. In these or other embodiments, the usage information may be obtained based on the existing ML information, such as described above with respect to block 302 of the method 300 of FIG. 3A.

At block 804, one or more existing functional blocks of the existing ML pipelines may be identified. In some embodiments, the existing functional blocks may be identified based on the functional blocks of the pipeline skeleton ("skeleton blocks") of the new ML project. For example, in some embodiments, the existing functional blocks may be identified based on being the same as the skeleton blocks (e.g., based on having a same name and/or functionality).

At block 806, one or more existing datasets of the existing ML projects may be identified based on the identified existing functional blocks. For example, the existing datasets to which the existing functional blocks are applied may be identified. In some embodiments, the existing datasets may be identified using the usage information included in the existing ML project information.

At block 808, a respective similarity may be determined between the new dataset and each of the identified existing datasets. In some embodiments, the similarity may be determined based on a comparison between one or more obtained meta-features of the existing datasets and the new dataset. For example, the meta-features may include a number of rows of the datasets, a number of columns of the datasets, and/or column types of the columns of the datasets. In these or other embodiments, a respective similarity score may be determined based on how similar the different meta-features of the new dataset are to the corresponding meta-features of the respective existing datasets. For instance, the similarity scores may be determined using any suitable distance metric determination. In these or other embodiments, each of the existing datasets may be given a similarity ranking with respect to the other existing datasets regarding similarity to the new dataset. For example, the existing dataset may be ranked such that the most similar existing dataset, as indicated by the similarity analysis, is ranked highest. In some embodiments, the code snippets themselves may be ranked according to the rankings of their corresponding existing datasets.

At block 810, one or more existing code snippets may be identified and selected based on the existing dataset similarity determinations. For example, existing code snippets derived from pipelines for the highest ranked existing datasets may be identified. In these or other embodiments, existing code snippets that are applied to existing datasets that satisfy a similarity threshold with respect to the new dataset may be identified. In these or other embodiments, the existing code snippets may be those that instantiate the existing functional blocks identified at block 804 that are also associated with the highest ranked existing datasets. In these or other embodiments, the identified code snippets may be identified based on the code snippet rankings that may correspond to the existing dataset rankings. In some embodiments, the rankings of the code snippets may be included in augmented code snippet information, such as the augmented code snippet information 730 of FIG. 7.

The identified existing code snippets may be identified as potential instantiations of the skeleton blocks of the pipeline skeleton in some embodiments. For example, the identified existing code snippets may be the code snippets 728 of FIG. 7 in some embodiments.

Modifications, additions, or omissions may be made to the method 800 without departing from the scope of the present disclosure. For example some of the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 9:
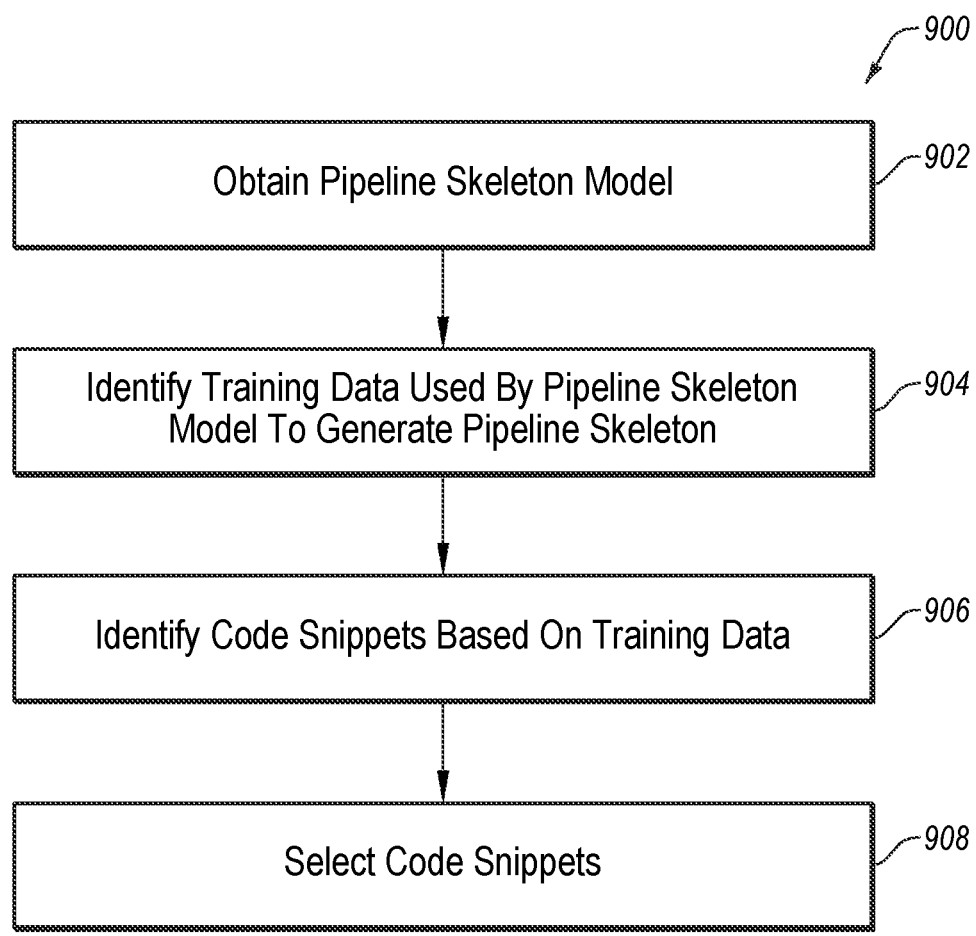
FIG. 9 is a flowchart of another example method of obtaining code snippets for instantiation of a pipeline skeleton.

FIG. 9 is a flowchart of an example method 900 of obtaining code snippets for instantiation of a pipeline skeleton, according to at least one embodiment described in the present disclosure. The method 900 may be performed by any suitable system, apparatus, or device. For example, the modification module 120 of FIG. 1 or the computing system 1202 of FIG. 12 (e.g., as directed by a modification module) may perform one or more of the operations associated with the method 900. Although illustrated with discrete blocks, the steps and operations associated with one or more of the blocks of the method 900 may be divided into additional blocks, combined into fewer blocks, or eliminated, depending on the particular implementation. Further, as indicated above, in some embodiments, one or more of the operations of the method 900 may be performed with respect to the code snippet identification 720 of FIG. 7.

The method 900 may include a block 902, at which a pipeline skeleton model may be obtained. As indicated above, the pipeline skeleton model may be an ML model used to generate the pipeline skeleton for which the code snippets may be identified. In some embodiments, the pipeline skeleton model may have been previously generated. In these or other embodiments, the pipeline skeleton model may be generated at block 902 as part of obtaining the pipeline skeleton model. For example, the pipeline skeleton model may be generated by training a multivariate multi-valued classifier such as described above. In these or other embodiments, the pipeline skeleton may be generated at block 902 using the pipeline skeleton model.

At block 904, training data used by the pipeline skeleton model to generate the pipeline skeleton may be identified. In some embodiments, identifying the training data may include identifying the meta-features of the new ML project (e.g., meta-features of the new dataset and/or corresponding new task) that are used by the pipeline skeleton model to predict the functional blocks to include in the pipeline skeleton. In these or other embodiments, the meta-features may be identified on a functional block by functional block basis of the skeleton blocks such that the meta-features used to determine each individual skeleton block of the pipeline skeleton may be identified.

In some embodiments, the identification of the meta-features used in making predictions may be based on one or more "white-box" techniques in which the structure of the pipeline skeleton model is known. For example, for instances in which the pipeline skeleton model is based on a decision tree family, the path used to arrive at a particular decision for a particular functional block for inclusion in the pipeline skeleton may be identified. In these or other embodiments, each path used to arrive at each of the respective decisions for each of the respective functional blocks of the pipeline skeleton may be identified. Another example "white-box" technique may include finding the dominant terms used in linear regression models of the pipeline skeleton model. The above are merely example "white-box" techniques and any other suitable white-box technique may be used.

Additionally or alternatively, the identification of the meta-features used in making predictions may be based on one or more "black-box" techniques in which the particular structure of the pipeline skeleton model may not be known or needed. Such "model agnostic" techniques may include any suitable technique including a LIME (Local Interpretable Model-agnostic Explanation) technique or a SHAP (Shapely Additive exPlanations) technique.

In some embodiments, the identified meta-features may be used to generate one or more dataset vectors of the new dataset ("new dataset vectors") with respect to the pipeline skeleton model. These new dataset vectors may be a vector of values of the identified meta-feature, for the new dataset. In some embodiments, a new dataset vector may be identified for each skeleton block.

In these or other embodiments, the new dataset vectors may be used to identify existing ML projects used as training data that may have been influential in the generation of the pipeline skeleton. For example, dataset vectors of the existing ML projects ("existing dataset vectors") may be constructed from existing ML datasets analogous to the construction of the new dataset vectors from the new dataset, by computing the previously identified meta-features in the context of the existing datasets. In these or other embodiments, existing dataset vectors that are closest to the new dataset vectors may be identified. For example, existing dataset vectors that are within a threshold distance of the new dataset vector may be identified.

In some embodiments, a determination as to the closest existing dataset vectors may be made with respect to different new dataset vectors that correspond to different skeleton blocks of the pipeline skeleton. In some embodiments, the closest existing dataset vectors may be identified by performing any suitable closest point analysis between each respective new dataset vector and each respective existing dataset vector. In some embodiments, the training data associated with the existing ML projects that correspond to the closest existing dataset vectors may be identified as training data that was influential in the generation of the pipeline skeleton.

At block 906, one or more code snippets may be identified from the training data identified at block 904. For example, in some embodiments, existing ML pipelines of the existing ML projects associated with (e.g., included in or indicated by) the training data may be identified. Further, code snippets that instantiate existing functional blocks of the existing ML pipelines may also be identified.

In some embodiments, different code snippets from different existing ML pipelines associated with different ML projects that may have contributed to selection of a same functional block may be ranked with respect to each other. In some embodiments, the rankings may be based on the distance of the new dataset vector with respect to the existing dataset vectors of the existing ML projects that correspond to the code snippets. For example, a first code snippet may correspond to a first ML project having a first existing dataset vector that is a first distance from the new dataset vector. In addition, a second code snippet may correspond to a second ML project having a second existing dataset vector that is a second distance from the new dataset vector, in which the second distance is larger than the first distance. The first code snippet in this example may be ranked higher than the second code snippet.

At block 908, one or more of the identified code snippets may be selected. In some embodiments, the selected code snippets may be selected based on those code snippets instantiating existing functional blocks indicated by the training data that correspond to the skeleton blocks of the pipeline skeleton. As such, the selected code snippets may be selected based on training data used to determine the skeleton blocks of the pipeline skeleton. In some embodiments, the selected code snippets may be those that have a certain ranking. In some embodiments, the rankings of the code snippets may be included in augmented code snippet information, such as the augmented code snippet information 730 of FIG. 7.

Modifications, additions, or omissions may be made to the method 900 without departing from the scope of the present disclosure. For example some of the operations of method 900 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 10:
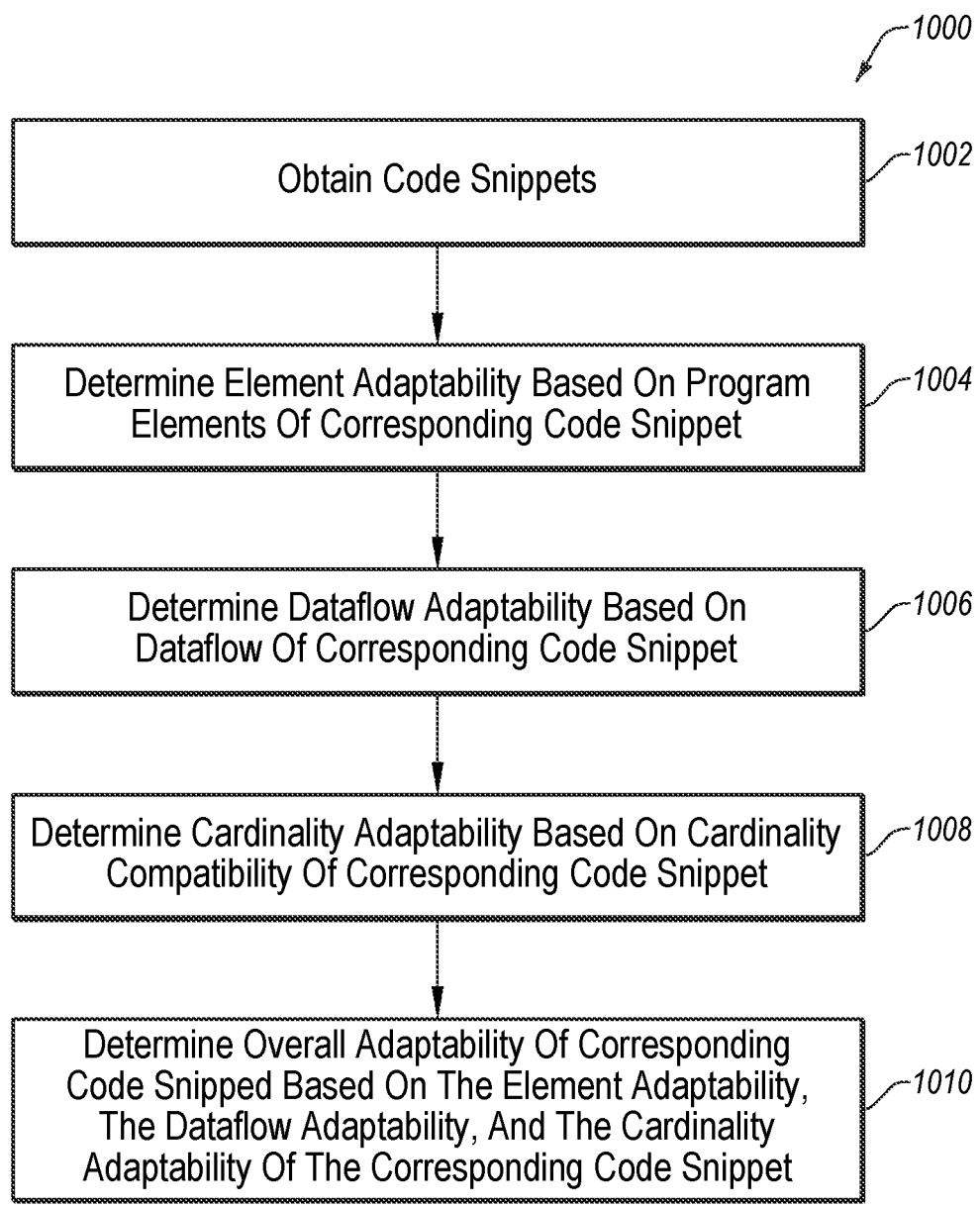
FIG. 10 is a flowchart of an example method of determining an adaptability of code snippets for implementation with respect to a pipeline skeleton.

FIG. 10 is a flowchart of an example method 1000 of determining an adaptability of code snippets for implementation with respect to a pipeline skeleton, according to at least one embodiment described in the present disclosure. The method 1000 may be performed by any suitable system, apparatus, or device. For example, the modification module 120 of FIG. 1 or the computing system 1202 of FIG. 12 (e.g., as directed by a modification module) may perform one or more of the operations associated with the method 1000. Although illustrated with discrete blocks, the steps and operations associated with one or more of the blocks of the method 1000 may be divided into additional blocks, combined into fewer blocks, or eliminated, depending on the particular implementation. As indicated above, in some embodiments, one or more of the operations of the method 1000 may be performed with respect to the adaptability analysis 722 of FIG. 7. Additionally or alternatively, the method 1000 may be performed with respect to code snippets identified using the method 800 and/or the method 900 of FIGS. 8 and 9, respectively.

The method 1000 may include a block 1002, at which code snippets identified for potential instantiation of a pipeline skeleton may be obtained. For example, the code snippets 728 of FIG. 7, which may be identified using the methods 800 or 900 in some embodiments.

At block 1004, an element adaptability may be determined for each respective code snippet. In some embodiments, the element adaptability may be based on program elements of the corresponding code snippet. For example, the program elements may be identified and a determination may be made as to whether the program elements are general code elements or domain specific code elements. General code elements may include those code elements that may be generally applicable across multiple datasets. By contrast, domain specific code elements may include those code elements that are specific to the dataset to which the corresponding code snippet is applied.

In some embodiments, identifying the program elements may include extracting all the constants from the corresponding code snippet and identifying the constants as program elements. Additionally or alternatively, the identified constants may be compared against names or values of the dataset to which the code snippet is applied. For example, the constants may be compared against column names of the dataset. Additionally or alternatively, the constants may be compared against values included in fields of the dataset. In response to a particular constant matching a name or value of the dataset, the program element corresponding therewith may be determined to be a domain specific code element. By contrast, in response to a particular constant not matching a name or value of the dataset, the program element corresponding therewith may be determined to be a general code element.

In these or other embodiments, a determination may be made as to whether the domain specific code elements may be mapped to a new dataset of the new ML project to which the pipeline skeleton corresponds. For example, it may be determined whether the new dataset includes names or values that may be mapped to the names or values of the existing dataset to which a particular domain specific code element corresponds. In response to the new dataset including names or values that may be mapped to the names or values of the existing dataset, the particular domain specific code element may be deemed as being mappable to the new dataset.

The element adaptability of a respective code snippet may be based on whether the respective code snippet includes any domain specific code elements. For example, in some embodiments, a particular code snippet may be deemed as potentially not having element adaptability in response to the particular code snippet including one or more domain specific code elements. In these or other embodiments, it may be determined whether the domain specific code elements are mappable to the new dataset. In response to the domain specific code elements being mappable to the new dataset, the particular code snippet may be deemed as having element adaptability. By contrast, in response to one or more of the domain specific code elements not being mappable to the new dataset, the particular code snipped may be deemed as not having element adaptability. Additionally or alternatively, in response to a particular code snippet only having general code elements, the particular code snippet may be deemed as having element adaptability.

At block 1006, a dataflow adaptability may be determined for each respective code snippet. In some embodiments, the dataflow adaptability may be based on the flow of inputs that may be input to the corresponding code snippet and the flow of outputs that may be output by the corresponding code snippet. In particular, it may be determined whether the inputs are derived from a dataframe of the corresponding dataset and whether the outputs are sent to a dataframe of the corresponding dataset. The corresponding code snippet may be deemed as having dataflow adaptability in response to the inputs and the outputs all corresponding to dataframes (e.g., deriving from or being sent to dataframes). By contrast, the corresponding code snippet may be deemed as not having dataflow adaptability in response to one or more of the inputs and/or one or more of the outputs not corresponding to a dataframe.

In some embodiments, a static analysis may be performed to determine the inputs and outputs for each code snippet. Further, the static analysis may indicate from which portions of the corresponding existing dataset the inputs may be obtained and/or to which portions of the corresponding existing dataset the outputs may be sent. The static analysis may thus indicate whether the inputs or outputs correspond to dataframes of the corresponding existing dataset.

At block 1008, a cardinality adaptability may be determined for each respective code snippet. The cardinality adaptability may be based on a cardinality compatibility of the corresponding code snippet with respect to the new dataset. For example, the cardinality compatibility may be based on a number of portions (e.g., a number of columns) the corresponding code snippet is applied to with respect to its corresponding existing dataset as compared to the number of portions the corresponding code snippet may be applied to with respect to the new dataset.

For example, to determine the cardinality adaptability, it may be determined as to how many portions (e.g., columns) of the new dataset the corresponding code snippet may be applied. In some embodiments, this determination may be made based on block instantiations that may be included in the pipeline skeleton (e.g., the block instantiations 718 of FIG. 7). For example, the corresponding code snippet may be selected for potential instantiation of a particular functional block of the pipeline skeleton. Further, the block instantiations may indicate to which portions of the new dataset to apply the particular functional block. Therefore, it may be determined as to how many portions of the new dataset the corresponding code snippet may be applied as an instantiation of the particular functional block. The determined number of portions of the new dataset to which the corresponding code snippet may be applied may be referred to as "new dataset portion number." In addition, it may be determined as to how many portions of the corresponding existing dataset the corresponding code snippet is applied. This determination may be based on any suitable analysis of the corresponding code snippet. The determined number of portions of the existing dataset to which the corresponding code snippet is applied may be referred to as "existing dataset portion number."

The cardinality adaptability may be based on a comparison between the new dataset portion number and the existing dataset portion number. For example, a first code snippet may have a first new dataset portion number that equals a first existing dataset portion number. Further, a second code snippet may have a second new dataset portion number that does not equal a second existing dataset portion number. In this example, the first code snippet may have a higher cardinality adaptability than the second code snippet.

In some embodiments, in response to the new dataset portion number not matching the existing dataset portion number, it may be determined whether one or more transformations may be applied to the corresponding code snippet to improve the cardinality adaptability. For example, in response to the existing dataset portion number being one and the new dataset portion number being greater than one for a particular code snippet, the particular code snippet may be placed in a loop that is iterated a number of times that matches the new dataset portion number. In these or other embodiments, a code snippet that is transformable to improve the cardinality may still be deemed has having a lower cardinality adaptability than a code snippet that has matching cardinality. Additionally or alternatively, a code snippet that is transformable to improve the cardinality may be deemed has having a higher cardinality adaptability than a code snippet that is not transformable to improve the cardinality. In these or other embodiments, a code snippet may be generally considered as having cardinality adaptability in response to the code snippet having matching new dataset portion numbers and existing dataset portion numbers or in response to the code snippet being transformable such that the different dataset portion numbers match.

In some embodiments, the method 1000 may include a block 1010 at which an overall adaptability may be determined for each respective code snippet. In some embodiments, the overall adaptability may be based on a combination of two or more of the element adaptability, the dataflow adaptability, or the cardinality adaptability. In these or other embodiments, the overall adaptability may be based on a combination of all of the element adaptability, the dataflow adaptability, and the cardinality adaptability.

For example, in some embodiments, the corresponding code snippet may be deemed as having an overall adaptability in which the corresponding code snippet is deemed as either being adaptable or not adaptable. In some embodiments, the corresponding code snippet may be deemed as having overall adaptability in response to the corresponding code snippet being determined as having element adaptability, dataflow adaptability, and cardinality adaptability.

In these or other embodiments, code snippets that are potential instantiations of the same skeleton block of the pipeline skeleton may be ranked with respect to each other and their respective adaptabilities. For example, a first code snippet may have a domain specific code element that is mappable to the new dataset such that the first code snippet may have program element adaptability. In addition, a second code snippet that instantiates the same skeleton block may have program element adaptability because it may only have general code elements. The second code snippet may accordingly be ranked higher than the first code snippet with respect to program element adaptability. Additionally or alternatively, all other things being equal, the second code snippet may be ranked higher than the first code snippet with respect to overall adaptability. Similarly, code snippets that have cardinality adaptability by virtue of a transformation may be ranked lower than code snippets that have cardinality adaptability without needing a transformation.

In some embodiments, the adaptability determinations with respect to the different code snippets may be included in augmented code snippet information such as the augmented code snippet information 730 of FIG. 7. Additionally or alternatively, the rankings of the code snippets based on the adaptability determinations may be included in the augmented code snippet information.

Modifications, additions, or omissions may be made to the method 1000 without departing from the scope of the present disclosure. For example some of the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 11:
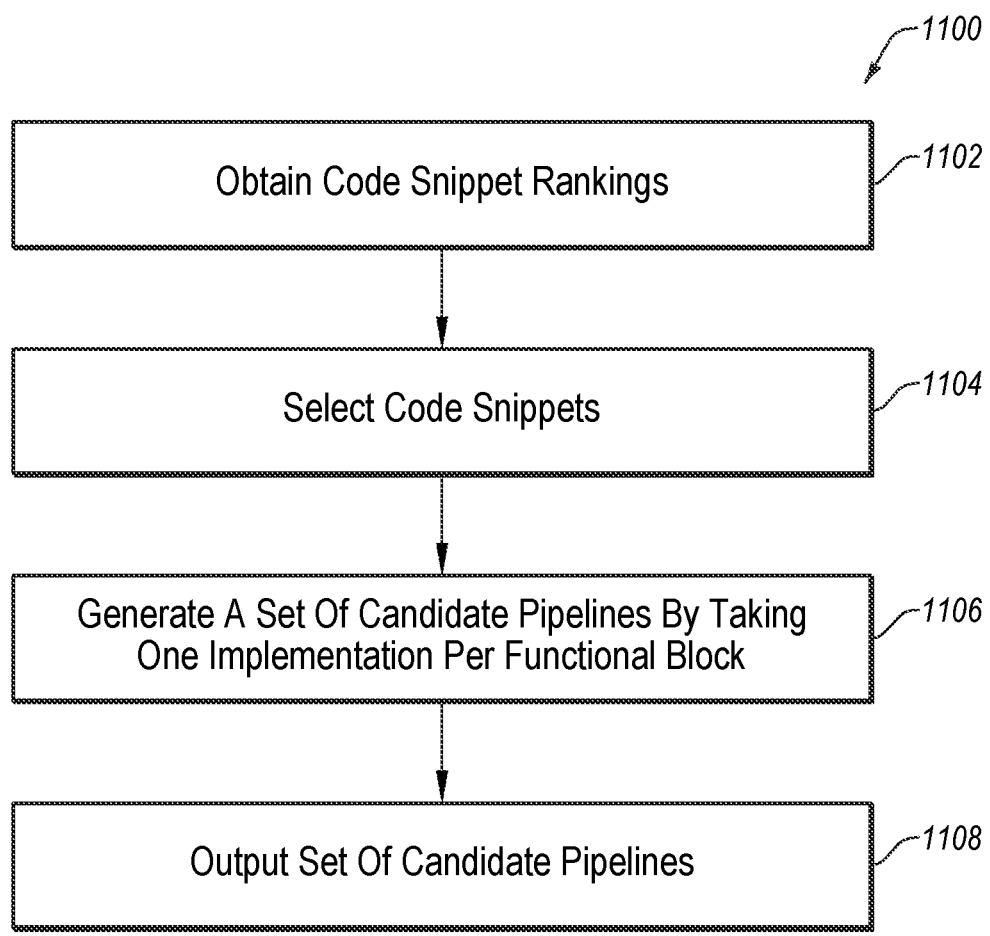
FIG. 11 is a flowchart of an example method of generating a set of candidate pipelines.

FIG. 11 is a flowchart of an example method 1100 of generating a set of candidate pipelines, according to at least one embodiment described in the present disclosure. The method 1100 may be performed by any suitable system, apparatus, or device. For example, the modification module 120 of FIG. 1 or the computing system 1202 of FIG. 12 (e.g., as directed by a modification module) may perform one or more of the operations associated with the method 1100. Although illustrated with discrete blocks, the steps and operations associated with one or more of the blocks of the method 1100 may be divided into additional blocks, combined into fewer blocks, or eliminated, depending on the particular implementation.

In general, the method 1100 may include the generation of multiple concrete pipelines as potential instantiations of a pipeline skeleton of a new ML project. The multiple concrete pipelines may accordingly be candidate pipelines of the new ML project that may be applied to a new dataset of the new ML project. As indicated above, in some embodiments, one or more of the operations of the method 1100 may be performed with respect to the candidate pipeline generation 724 of FIG. 7. Additionally or alternatively, the method 1100 may be performed using the augmented code snippet information 730 with respect to the code snippets 728 of FIG. 7, which may be identified using the method 800, 900, and/or 1000 of FIGS. 8, 9, and 10, respectively.

The method 1100 may include a block 1102, at which code snippet rankings for different code snippets that may be identified to instantiate the pipeline skeleton may be obtained. The code snippet rankings may be based on a skeleton block by skeleton block basis of the skeleton blocks of the pipeline skeleton. For example, the code snippets may be grouped according to the skeleton blocks that the respective code snippets may instantiate. In these or other embodiments, the code snippet rankings may be for each different group of code snippets. For instance, a first group of code snippets that correspond to a first skeleton block may be ranked with respect to each other and a second group of code snippets that correspond to a second skeleton block may be ranked with respect to each other. The code snippet rankings may include any suitable combination of adaptability rankings such as described above with respect to the method 1000 in some embodiments. Additionally or alternatively, the code snippet rankings may include the rankings used to select the code snippets such as described above with respect to method 800 or method 900.

At block 1104 a respective code snippet may be selected for each skeleton block of the pipeline skeleton. In some embodiments, the respective code snippets may be selected based on their respective rankings in their respective sets. For example, the highest ranked code snippet of the first set of code snippets may be selected for the first skeleton block and the highest ranked code snippet of the second set of code snippets may be selected for the second skeleton block. In these or other embodiments, multiple different code snippets may be selected for each of the skeleton blocks such that more than one instantiation of each skeleton block may be evaluated.

In some embodiments, at block 1104 the operations may also include transforming each selected code snippet in the context of the new dataset. This transforming may include resolving any discrepancies in variable names or object names (e.g., adapting names based on program analysis) of the code snippets.

At block 1106, a set of candidate pipelines may be generated using the selected code snippets. For example, each candidate pipeline may be a concrete pipeline that includes an instantiation of each of the skeleton blocks of the pipeline skeleton. As such, in some embodiments, sets of selected code snippets may be selected as pipeline groups that may each be used to generate a candidate pipeline.

For instance, the pipeline skeleton may include skeleton blocks A-D. Further multiple pipeline groups may be selected to generate multiple candidate pipelines of the pipeline skeleton. For example, a first pipeline group may be used to generate a first candidate pipeline of the pipeline skeleton in which the first pipeline group includes a first code snippet that instantiates skeleton block A, a second code snippet that instantiates skeleton block B, a third code snippet that instantiates skeleton block C, and a fourth code snippet that instantiates skeleton block D. Additionally, a second pipeline group may be used to generate a second candidate pipeline of the pipeline skeleton in which the second pipeline group includes a fifth code snippet that instantiates skeleton block A, a sixth code snippet that instantiates skeleton block B, a seventh code snippet that instantiates skeleton block C, and an eighth code snippet that instantiates skeleton block D. In this example, the first and fifth code snippets may be part of the same set of code snippets that corresponds to skeleton block A, the second and sixth code snippets may be part of the same set of code snippets that corresponds to skeleton block B, the third and seventh code snippets may be part of the same set of code snippets that corresponds to skeleton block C, and the fourth and eighth code snippets may be part of the same set of code snippets that corresponds to skeleton block D.

In some embodiments, a different skeleton group may be generated for each of the different permutations of the different combinations of code snippets. As such, in some embodiments, the set of candidate pipelines generated at block 1106 may include a different candidate pipeline for each of the different permutations.

In some embodiments, template code may be added to each of the candidate pipelines of the set of candidate pipelines. The template code may provide standard instantiations of common operations that appear in all pipelines, including reading in the dataset, splitting it into a training and a testing dataset, fitting the model from the instantiated pipeline skeleton on the training data, and evaluating the trained model on the testing data. Since such operations typically may not vary in functionality or syntax from one pipeline or dataset to another, standard boiler-plate code, instantiated with appropriate parameters may be used to complete these parts of the instantiated pipeline in some embodiments.

At block 1108, the set of candidate pipelines may be output. Each concrete pipeline of the set of candidate pipelines may be a candidate instantiation of the pipeline skeleton.

Modifications, additions, or omissions may be made to the method 1100 without departing from the scope of the present disclosure. For example some of the operations of method 1100 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 12:
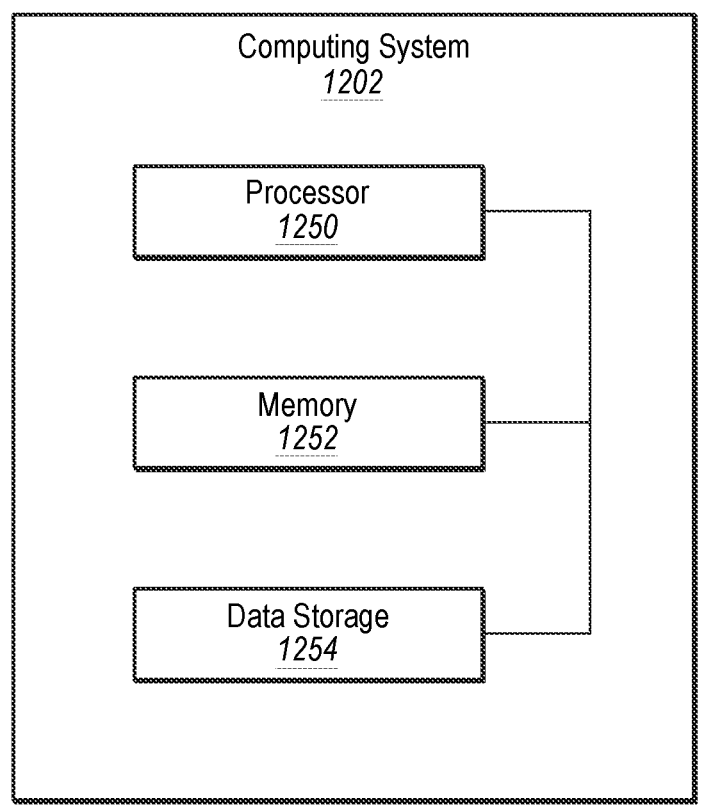
FIG. 12 illustrates a block diagram of an example computing system.

FIG. 12 illustrates a block diagram of an example computing system 1202, according to at least one embodiment of the present disclosure. The computing system 1202 may be configured to implement or direct one or more operations associated with a modification module (e.g., the modification module 120 of FIG. 1). The computing system 1202 may include a processor 1250, a memory 1252, and a data storage 1254. The processor 1250, the memory 1252, and the data storage 1254 may be communicatively coupled.

In general, the processor 1250 may include any suitable special-purpose or general-purpose computer, computing entity, or processing device including various computer hardware or software modules and may be configured to execute instructions stored on any applicable computer-readable storage media. For example, the processor 1250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 12, the processor 1250 may include any number of processors configured to, individually or collectively, perform or direct performance of any number of operations described in the present disclosure. Additionally, one or more of the processors may be present on one or more different electronic devices, such as different servers.

In some embodiments, the processor 1250 may be configured to interpret and/or execute program instructions and/or process data stored in the memory 1252, the data storage 1254, or the memory 1252 and the data storage 1254. In some embodiments, the processor 1250 may fetch program instructions from the data storage 1254 and load the program instructions in the memory 1252. After the program instructions are loaded into memory 1252, the processor 1250 may execute the program instructions.

For example, in some embodiments, the modification module may be included in the data storage 1254 as program instructions. The processor 1250 may fetch the program instructions of a corresponding module from the data storage 1254 and may load the program instructions of the corresponding module in the memory 1252. After the program instructions of the corresponding module are loaded into memory 1252, the processor 1250 may execute the program instructions such that the computing system may implement the operations associated with the corresponding module as directed by the instructions.

The memory 1252 and the data storage 1254 may include computer-readable storage media for carrying or having computer-executable instructions or data structures stored thereon. Such computer-readable storage media may include any available media that may be accessed by a general-purpose or special-purpose computer, such as the processor 1250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 1250 to perform a certain operation or group of operations.

Modifications, additions, or omissions may be made to the computing system 1202 without departing from the scope of the present disclosure. For example, in some embodiments, the computing system 1202 may include any number of other components that may not be explicitly illustrated or described.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining a machine learning (ML) pipeline skeleton that indicates a set of first functional blocks to use to process a new dataset of a new ML project;
obtaining a relationship mapping that maps dataset features to respective functional blocks, the relationship mapping indicating correspondences between dataset features of existing datasets of existing ML projects and usage of second functional blocks of existing ML pipelines of the existing ML projects;
mapping the first functional blocks to respective portions of the new dataset based on the relationship mapping; and
instantiating the ML pipeline skeleton with respective code snippets that each correspond to a respective first functional block of the set of first functional blocks, the respective code snippets each including one or more respective code elements that are based on the mapping of the first functional blocks.

2. The method of claim 1, wherein obtaining the relationship mapping includes:
identifying usage of the second functional blocks with respect to different portions of the existing datasets having different dataset features; and
determining the relationship mapping between the second functional blocks and the dataset features based on the identified usage.

3. The method of claim 2, wherein the usage includes a number of times a particular second functional block is used with portions of the existing datasets having a particular feature and wherein the relationship mapping is determined based on the number of times.

4. The method of claim 3, further comprising determining a conditional probability based on the usage, the condition probability indicating a likelihood of application of the particular second functional block with respect to the particular feature based on the number of times and wherein determining the relationship mapping is based on the conditional probability.

5. The method of claim 1, further comprising:
determining dependencies between the second functional blocks based on usage of the second functional blocks with respect to different portions of the existing datasets; and
determining dependencies between the first functional blocks based on the determined dependencies between second functional blocks that have a same functionality as the first functional blocks; and removing one or more first functional blocks from the ML pipeline skeleton based on the determined dependencies between the first functional blocks.

6. The method of claim 5, wherein:

identifying the usage includes identifying which of the second functional blocks are applied to which portions of the one or more existing datasets; and determining the dependencies between the second functional blocks is based on shared application of the second functional blocks with respect to the same portions of the one or more existing datasets.

7. The method of claim 1, wherein the mapping the first functional blocks to the portions of the new dataset based on the relationship mapping includes:

identifying a first particular portion of the new dataset that shares a same feature as a second particular portion of a particular dataset of the existing datasets;

identifying a particular second functional block that is mapped to the second particular portion in the relationship mapping; and mapping a particular first functional block to the first particular portion based on:
the particular first functional block corresponding to the particular second functional block;
the second particular functional block being mapped to the second particular portion; and
the first particular portion and the second particular portion sharing the same feature.

8. One or more non-transitory computer-readable storage media configured to store instructions that, in response to being executed, cause a system to perform operations, the operations comprising:

obtaining a machine learning (ML) pipeline skeleton that indicates a set of first functional blocks to use to process a new dataset of a new ML project;

obtaining a relationship mapping that maps dataset features to respective functional blocks, the relationship mapping indicating correspondences between dataset features of existing datasets of existing ML projects and usage of second functional blocks of existing ML pipelines of the existing ML projects;

mapping the first functional blocks to respective portions of the new dataset based on the relationship mapping; and instantiating the ML pipeline skeleton with respective code snippets that each correspond to a respective first functional block of the set of first functional blocks, the respective code snippets each including one or more respective code elements that are based on the mapping of the first functional blocks.

9. The one or more non-transitory computer-readable storage media of claim 8, wherein obtaining the relationship mapping includes:

identifying usage of the second functional blocks with respect to different portions of the existing datasets having different dataset features; and determining the relationship mapping between the second functional blocks and the dataset features based on the identified usage.

10. The one or more non-transitory computer-readable storage media of claim 9, wherein the usage includes a number of times a particular second functional block is used with portions of the existing datasets having a particular feature and wherein the relationship mapping is determined based on the number of times.

11. The one or more non-transitory computer-readable storage media of claim 10, the operations further comprising determining a conditional probability based on the usage, the condition probability indicating a likelihood of application of the particular second functional block with respect to the particular feature based on the number of times and wherein determining the relationship mapping is based on the conditional probability.

12. The one or more non-transitory computer-readable storage media of claim 8, the operations further comprising:

determining dependencies between the second functional blocks based on usage of the second functional blocks with respect to different portions of the existing datasets; and determining dependencies between the first functional blocks based on the determined dependencies between second functional blocks that have a same functionality as the first functional blocks; and removing one or more first functional blocks from the ML pipeline skeleton based on the determined dependencies between the first functional blocks.

13. The one or more non-transitory computer-readable storage media of claim 12, wherein:

identifying the usage includes identifying which of the second functional blocks are applied to which portions of the one or more existing datasets; and determining the dependencies between the second functional blocks is based on shared application of the second functional blocks with respect to the same portions of the one or more existing datasets.

14. The one or more non-transitory computer-readable storage media of claim 8, wherein the mapping the first functional blocks to the portions of the new dataset based on the relationship mapping includes:

identifying a first particular portion of the new dataset that shares a same feature as a second particular portion of a particular dataset of the existing datasets;

identifying a particular second functional block that is mapped to the second particular portion in the relationship mapping; and mapping a particular first functional block to the first particular portion based on:
the particular first functional block corresponding to the particular second functional block;
the second particular functional block being mapped to the second particular portion; and
the first particular portion and the second particular portion sharing the same feature.

15. A system comprising:

one or more processors; and one or more non-transitory computer-readable storage media configured to store instructions that, in response to being executed by the one or more processors, cause the system to perform operations, the operations comprising:

obtaining a machine learning (ML) pipeline skeleton that indicates a set of first functional blocks to use to process a new dataset of a new ML project;

obtaining a relationship mapping that maps dataset features to respective functional blocks, the relationship mapping indicating correspondences between dataset features of existing datasets of existing ML projects and usage of second functional blocks of existing ML pipelines of the existing ML projects;

mapping the first functional blocks to respective portions of the new dataset based on the relationship mapping; and instantiating the ML pipeline skeleton with respective code snippets that each correspond to a respective first functional block of the set of first functional blocks, the respective code snippets each including one or more respective code elements that are based on the mapping of the first functional blocks.

16. The system of claim 15, wherein obtaining the relationship mapping includes:
identifying usage of the second functional blocks with respect to different portions of the existing datasets having different dataset features; and
determining the relationship mapping between the second functional blocks and the dataset features based on the identified usage.

17. The system of claim 16, wherein the usage includes a number of times a particular second functional block is used with portions of the existing datasets having a particular feature and wherein the relationship mapping is determined based on the number of times.

18. The system of claim 17, the operations further comprising determining a conditional probability based on the usage, the condition probability indicating a likelihood of application of the particular second functional block with respect to the particular feature based on the number of times and wherein determining the relationship mapping is based on the conditional probability.

19. The system of claim 15, the operations further comprising:
determining dependencies between the second functional blocks based on usage of the second functional blocks with respect to different portions of the existing datasets; and
determining dependencies between the first functional blocks based on the determined dependencies between second functional blocks that have a same functionality as the first functional blocks; and
removing one or more first functional blocks from the ML pipeline skeleton based on the determined dependencies between the first functional blocks.

20. The system of claim 15, wherein the mapping the first functional blocks to the portions of the new dataset based on the relationship mapping includes:
identifying a first particular portion of the new dataset that shares a same feature as a second particular portion of a particular dataset of the existing datasets;
identifying a particular second functional block that is mapped to the second particular portion in the relationship mapping; and
mapping a particular first functional block to the first particular portion based on:
the particular first functional block corresponding to the particular second functional block;
the second particular functional block being mapped to the second particular portion; and
the first particular portion and the second particular portion sharing the same feature.

* * * * *